United States Patent
Lund

(10) Patent No.: US 9,945,299 B2
(45) Date of Patent: Apr. 17, 2018

(54) HOMOGENIZING FUEL ENHANCEMENT SYSTEM AND GAS PROCESSOR FOR USE THEREIN

(71) Applicant: EXEN Holdings, LLC, Escondido, CA (US)

(72) Inventor: Morten A. Lund, Vista, CA (US)

(73) Assignee: EXEN Holdings, LLC, Escondido, CA (US)

( * ) Notice: Subject to any disclaimer, the term of this patent is extended or adjusted under 35 U.S.C. 154(b) by 477 days.

(21) Appl. No.: 14/424,543

(22) PCT Filed: Sep. 5, 2013

(86) PCT No.: PCT/US2013/058237
§ 371 (c)(1),
(2) Date: Feb. 27, 2015

(87) PCT Pub. No.: WO2014/039663
PCT Pub. Date: Mar. 13, 2014

(65) Prior Publication Data
US 2015/0267626 A1     Sep. 24, 2015

Related U.S. Application Data

(60) Provisional application No. 61/697,060, filed on Sep. 5, 2012.

(51) Int. Cl.
*F02D 19/08* (2006.01)
*F02D 19/06* (2006.01)

(52) U.S. Cl.
CPC ....... *F02D 19/081* (2013.01); *F02D 19/0642* (2013.01); *F02D 19/0668* (2013.01); *Y02T 10/36* (2013.01)

(58) Field of Classification Search
CPC . F02D 19/081; F02D 19/0642; F02D 19/0668
See application file for complete search history.

(56) References Cited

U.S. PATENT DOCUMENTS

| 4,872,440 A | 10/1989 | Green |
| 7,861,696 B2 | 1/2011 | Lund |

(Continued)

FOREIGN PATENT DOCUMENTS

| WO | 2009/142769 A1 | 11/2009 |
| WO | 2011/041705 A1 | 4/2011 |

OTHER PUBLICATIONS

Office Action dated Dec. 14, 2016, in corresponding Chinese Patent Application No. 201380057453.1 (6 pages).

(Continued)

*Primary Examiner* — Jacob Amick
(74) *Attorney, Agent, or Firm* — Osha Liang LLP

(57) ABSTRACT

A fuel enhancement system and method for supplying an engine with a pressurized homogenized mixture of a liquid fuel and a gaseous component. In one embodiment the system comprises a controller; a gaseous component flow control device, a homogenization system, and a gas processor. In another embodiment, the system comprises a controller; a gaseous component flow control device, a device for generating signals indicative of liquid fuel flow, and a homogenization system. Particular embodiments of the gas processor and device for generating signals indicative of liquid fuel flow are also disclosed.

96 Claims, 17 Drawing Sheets

(56) References Cited

U.S. PATENT DOCUMENTS

2008/0245318 A1\* 10/2008 Kuroki .................... C01B 3/02
                                                    123/3
2012/0186560 A1   7/2012 Lund
2012/0186562 A1   7/2012 Achor
2012/0297752 A1  11/2012 Neels

OTHER PUBLICATIONS

International Search Report dated Apr. 23, 2014, in corresponding International Patent Application No. PCT/US2013/058237 (4 pages).

\* cited by examiner

HOMOGENIZING FUEL ENHANCEMENT SYSTEM AND GAS PROCESSOR FOR USE THEREIN

TECHNICAL FIELD

The present subject matter relates to homogenizing fuel enhancement systems. In particular, the present subject matter relates to pressure management and/or controlling release of gaseous components in such a system operating on a liquid-gas fuel mixture.

BACKGROUND

There has been significant effort over the past several decades to increase the efficiency of combustion engines or reduce the emissions of such engines. Some of these efforts have focused on the actual system design, and particularly the fuel delivery, injection, and combustion systems and processes.

Most efforts to increase the efficiency of internal combustion engines have to date achieved only marginal success at best, resulting in only a slight increase in actual efficiency and/or using approaches that are technologically or practically not workable (e.g., involving fuels that are not readily available or safely used, or adding tremendous cost and complexity to the engine).

However, U.S. Pat. No. 7,861,696, issued Jan. 4, 2011 to the present inventor and commonly owned herewith, discloses a significant advance over prior efforts to increase efficiency. This patent describes a multi-fuel co-injection system wherein, e.g., a liquid fuel (e.g., diesel) and a gaseous fuel (e.g., hydrogen) are mixed together (e.g., under real-time microprocessor control), and applied under pressure to the injector pump of an internal combustion engine. The patent also discloses the use of a circulation loop through which the fuel mixture is circulated under pressure, and from which the fuel mixture is fed to the engine injector pump.

Likewise, International Publication No. WO2009/142769 published on Nov. 26, 2009 by the present inventor and commonly owned herewith, discloses a fuel composition for use in an internal combustion engine comprising a homogeneous mixture of liquid fuel(s) and gaseous fuel(s) made homogeneous prior to introduction to the injection system of the engine, to promote atomization of the liquid fuel(s) in the combustion chamber, thereby improving combustion and increasing efficiency.

Similarly, International Publication No. WO2011/041705 published on Apr. 7, 2011 by the present inventor and commonly owned herewith describes a homogenizing fuel enhancement system utilizing a circulation system including an infusion volume to deliver a homogeneous mixture of gaseous and liquid fuel to the injection system of the engine. In flowing through the infusion volume the gaseous fuel is infused into the liquid fuel and the mixture rendered more homogeneous. The use of various embodiments of infusion tubes to constitute the infusion volume is also disclosed.

However, such systems can create higher than conventional back pressures that stress engine components (such as, e.g., fuel injectors and flow regulating solenoid valves) and make the engine run unevenly, resulting in less-than-optimal efficiencies, and ultimately damaging the engine. There remains a need to accommodate such high back pressures, without degrading system efficiency or causing potentially damaging cavitation in pumps operating on gaseous-liquid fuel mixtures. Further, in some cases the gaseous component employed in such systems is particularly volatile, e.g., hydrogen. There remains a need to improve mechanisms for managing gaseous component outgassed from the system and avoiding potentially dangerous buildup of such gaseous component. There also remains a need for a simple and inexpensive control system for such homogenizing fuel enhancement systems.

SUMMARY OF THE INVENTION

One aspect of the present invention provides a particularly advantageous fuel enhancement system for supplying the engine with a pressurized homogenized mixture of a liquid fuel and a gaseous component comprising a controller; a gaseous component flow control device, a homogenization system, and a gas processor. The gaseous component flow control device controllably provides gaseous component to the homogenization system. The homogenization system includes a first portion, operating at relatively low pressure, which receives the liquid fuel and unused fuel mixture from back-pressure sensitive components of the engine. The controller receives indicia of at least one predetermined operating parameter of the homogenization system, and provides control signals to the gaseous component flow control device to control the ratio of gaseous component to liquid fuel. The homogenization system mixes the liquid fuel and gaseous component, and provides a fuel mixture to the engine at a relatively high pressure having relatively small bubbles of the gaseous component distributed throughout the mixture. The gas processor, disposed between the back-pressure sensitive engine component and the homogenization system first portion, brings unused fuel mixture to a relatively low predetermined pressure before providing the fuel mixture to the homogenization system first portion.

In accordance with another aspect of the present invention the gas processor also conditions the fuel mixture to make it suitable for introduction to the first portion of the homogenization system. For example, the gas processor may condition the fuel mixture by outgassing at least a portion of the gaseous component from the fuel mixture before introduction to first portion of the homogenization system. This can be accomplished, for example, by retaining the fuel mixture at the relatively low pressure for at least a minimum period of time. The outgassed component, may be, if desired, conducted to the engine air intake.

In accordance with another aspect of the present invention, various valves are closed upon shut down of the engine, to maintain pressure within portions of the homogenization system. Another aspect of the present invention provides a particularly advantageous gas processor for outgassing a gaseous component of a fuel-liquid fuel mixture. The gas processor comprise: a body defining an interior volume; a float assembly; a fuel inlet; a gas outlet; and a fuel outlet, where the gas outlet and fuel outlet are in fluid communication with the fuel inlet.

Yet another aspect of the present invention provides a particularly advantageous fuel enhancement system for supplying an engine with a pressurized homogenized fuel mixture comprising a mixture of liquid fuel and gaseous component, comprising a controller; a gaseous component flow control device, a device for generating signals indicative of liquid fuel flow, and a homogenization system. The gaseous component flow control device, responsive to control signals applied thereto, controllably provides gaseous component to the homogenization system. The controller is receptive of the signals indicative of liquid fuel flow, and provides control signals to the gaseous component flow control device to control the ratio of gaseous component to liquid fuel. The homogenization system mixes the liquid fuel and gaseous component, and provides a fuel mixture to the engine at a relatively high pressure having relatively small bubbles of the gaseous component distributed throughout the mixture. The device for generating signals indicative of liquid fuel flow comprises: a body defining an interior volume; a fuel inlet, communicating with the interior volume, adapted to receive the liquid fuel from the liquid fuel source; a fuel outlet, communicating with the interior volume, adapted to supply the fuel exiting the interior volume to the homogenization system at the relatively low pressure; and a fuel level detector disposed within the interior volume, which generates indicia of the fluid level in the internal volume. The indicia of the fluid level in the internal volume is provided as signals indicative of liquid fuel flow to the controller.

Another aspect of the present invention provides a device adapted for use within a fuel enhancement system for supplying an engine with a pressurized homogenized fuel mixture comprising a mixture of a liquid fuel and a gaseous component in controlled ratio. The device comprises: a body defining an interior volume; a fuel inlet, communicating with the interior volume, adapted to receive the liquid fuel; a fuel outlet, communicating with the interior volume, adapted to supply the fuel exiting the interior volume to the fuel enhancement system at the relatively low pressure; and a fuel level detector disposed within the interior volume. The fuel level detector generates indicia of the fluid level in the internal volume, which is utilized by the fuel enhancement system to control the amount of gaseous component admitted to the fuel enhancement system.

BRIEF DESCRIPTION OF THE DRAWING

Preferred embodiments of the present invention will hereinafter be described in conjunction with the figures of the appended drawing, wherein like designations denote like elements unless otherwise specified, and:

FIG. 1B is a simplified schematic drawing of a portion of a homogenizing fuel enhancement system of the type shown in FIG. 1 with provisions for increasing circulation flow in portions of the system.

FIG. 7A is a simplified schematic drawing of a portion of a homogenizing fuel enhancement system of the type shown in FIG. 7 with provisions for increasing the inlet pressure to the engine injector pump.

DETAILED DESCRIPTION OF THE PREFERRED EXEMPLARY EMBODIMENTS

Figure 1:
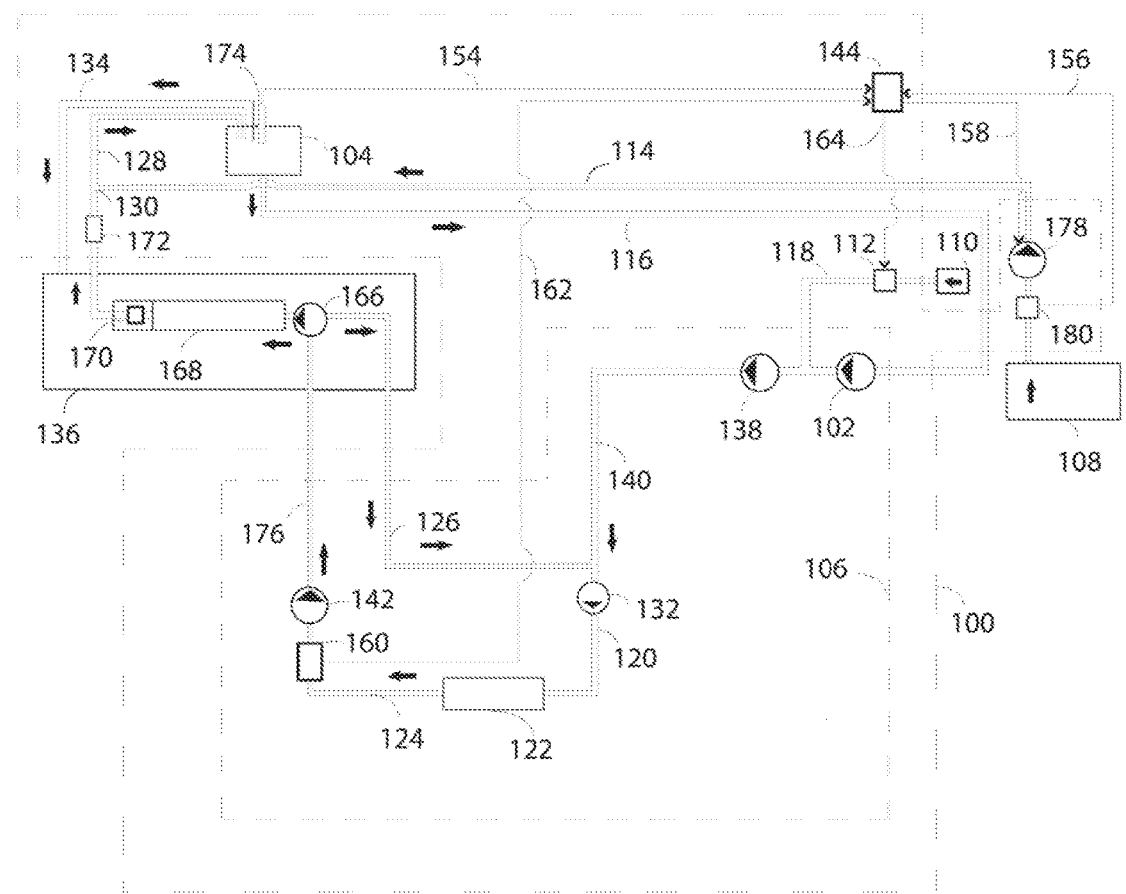
FIG. 1 is a simplified schematic drawing of a homogenizing fuel enhancement system utilizing an embodiment of a gas processor.

Referring now to FIG. 1, an exemplary homogenizing fuel enhancement system 100 cooperates with a source of liquid fuel 108, a source of a gaseous component 110, and an engine 136 having a fuel injection system 168. System 100 operates to improve the fuel efficiency of, and reduce emissions from, engine 136.

System 100 can be used with a variety of engines, engine fuel systems, and fuels (now known or later developed or discovered). The word "fuel" as used herein encompasses any combustible substance or any substance that aids in, enhances or otherwise affects combustion in some way. A "liquid fuel," as that term is used herein, means a fuel that is in a liquid state at atmospheric conditions (atmospheric pressure and nominal 20 degrees Celsius). For example suitable liquid fuels include, but are not limited to, crude oil, diesel fuel, gasoline, or combinations, and the like. In the embodiment of FIG. 1, the liquid fuel is suitably diesel fuel.

Liquid fuel source 108 may comprise any mechanism capable of controllably providing a flow of a liquid fuel suitable for use in engine 136. In vehicular applications, liquid fuel source 108 is disposed on-board the vehicle. For example, liquid fuel source 108 comprises a storage tank for maintaining a volume of the liquid fuel, and a fuel pump, for providing a flow of such liquid fuel to system 100. As will be discussed, in certain embodiments, a flow control device (which may be, or be incorporated in, a lift pump) and/or a flow sensing device to provide indicia of the volume of flow of liquid fuel to system 100 may be associated with source 108.

A "gaseous component," or "gaseous fuel component" as the term is used herein, refers to any substance that is in a gaseous state at atmospheric conditions, irrespective of the phases or states such a gaseous component may move through or be in at any particular point in an engine's fuel storage and delivery system, injector, or combustion chamber, generally, or specifically in the systems embodying the present subject matter. A gaseous component suitable for use in system 100 can be any gas that provides compressed bubbles within the liquid component of the mixture at the system pressure prior to injection, which expands upon introduction to the engine for combustion (e.g., in an internal combustion engine, introduction into the combustion chamber of the engine). This compression-release expansion of the gaseous component tends to result in atomization of the liquid fuel, as well as, perhaps, in some cases, free radical combustion and a cooling effect. Examples of suitable gaseous components include, but are not limited to, hydrogen (H2), hydrox (HHO), propane and natural gas, nitrogen gas, oxygen and air, or combinations thereof, as well as other inert gases and gases that possess the desired characteristics. Any gas that is capable of, under the particular system pressures, being infused relatively homogenously into the liquid fuel and which rapidly expands when the fuel mixture is injected into the engine cylinder may be utilized. As used herein the terms "homogenous" and "homogenized" means that the gaseous component is relatively uniformly suspended throughout the liquid in relatively small, relatively uniformly sized bubbles, such as, e.g., microbubbles, (extremely small bubbles, usually only a few hundred micrometers in diameter). It is preferable (although not necessary) that, the BTU value of the gaseous component is equal to or greater than that of the liquid fuel. Hydrogen gas is utilized in a preferred example of system 100.

Gaseous component source 110 may comprise any mechanism capable of controllably providing a flow of a suitable gaseous component. In vehicular applications, gaseous component source 110 is disposed on-board. For example, gaseous component source 110 suitably comprises a storage tank for maintaining a volume of the gaseous component under pressure. Alternatively, or in combination with a storage tank, gaseous component source 110 may include a mechanism for generating the gaseous component on-board. One exemplary on-board generating mechanism is a system that produces hydrogen and oxygen via electrolysis of water. As will be discussed, a flow control device, such as a pump or valve, is associated with source 110 for selectively, upon demand in accordance with control signals applied thereto, providing a flow of such gaseous component to system 100.

Engine 136 may be any engine employing fuel injection in which greater efficiency and/or reduced emissions are desired. Suitable engines may be, for example, internal combustion, external combustion and turbine engines. Exemplary system 100 suitably cooperates with a diesel engine 136, employing an injection pump 166 (preferably a high-pressure pump generating pressures in excess of 1500 psi, typically in the range of 10,000 to 20,000 psi) and fuel injection system 168. The fuel injection system may be any system which creates a fine spray of fuel and injects it directly into the combustion chamber of the engine. Conventional examples include common rail and mechanical type injection systems. In general, injection system 168 includes injectors, a mechanism to provide fuel to the injectors (e.g., the common rail in a common rail injection system), a mechanism to recirculate excess (un-injected) fuel and, in many cases, a pressure regulator 170 to provide a specific backpressure on the injection system. Injection pump 166 may be a conventional injection pump, (e.g., a piston pump, generating 20,000 psi). If desired, pump 166 can incorporate a capillary bleed device to protect against pump failure (and particularly seal failure) in the event of exposure to pressures in excess of the pump's ratings and/or prolonged exposure to high pressures when engine 136 and system 100 are turned off. A suitable capillary bleed device is described in PCT_US 1005116, filed Oct. 1, 2010 by the present inventor, and will be further described in conjunction with FIG. 11.

System 100 improves the fuel efficiency and reduces the emissions of engine 136 by supplying a homogenized liquid-gas fuel mixture for introduction into the combustion chamber of engine 136. The gaseous component of the fuel mixture is sufficiently pressurized and infused within the liquid to provide more complete atomization of the liquid upon rapid expansion caused by a pressure drop (e.g., from approximately 20,000 psi to 350 psi in a common rail system) when injected into the combustion chamber. Injection of highly pressurized homogenous fuel mixture also tends to encourage free radical combustion and an adiabatic cooling effect. All of these tend to result in greater fuel efficiency of engine 136, as well as lower emissions.

System 100 generally comprises: a suitable controller 144, a homogenization system 106, a device 104 typically operating as a gas processor, a flow control device (e.g., solenoid valve) 112 associated with gaseous component source 110 and respective fluid lines (conduits) and transmission paths (e.g., electrical wiring, wireless communication links, etc.) interconnecting the respective elements. System 100 also typically includes, associated with liquid fuel source 108: a flow control device (e.g., lift pump) 178, and, in certain embodiments, a flow sensor 180. In addition, in some cases, for example in many applications wherein engine 136 employs a common rail injection system, system 100 may also include a pressure regulator 172.

More specifically, in the exemplary system 100 of FIG. 1, fluid communication is provided: between liquid fuel source 108 and gas processor 104 by lines 114 and (line 114 joins with line 128 at juncture 130); between gaseous fuel source 110 and homogenization system 106 by line 118; between gas processor 104 and homogenization system 106 by line 116; between homogenization system 106 and engine 136 by lines 124 and 126; and between engine 136 and gas processor 104 by lines 128 and 134.

Controller 144 receives input signals regarding various operational parameters: from gas processor 104 on transmission path 154 (e.g., indicative of fuel flow); and from homogenization system 106 on transmission path 162 (e.g., indicative of a predetermined characteristic of the fuel mixture provided to engine 136). If employed, sensor 180 also provides an input signal to controller 144 on transmission path 156 (e.g., indicative of liquid fuel flow).

Controller 144 suitably provides control signals to flow control device 112 on transmission path 164 and, in embodiments employing active control of liquid fuel flow, to flow control device 178 through transmission path 158. For convenience of reference, control signals will be referred to by a parenthetical reference to the designation of the transmission paths through which they are transmitted. When employed, regulator 172 is suitably disposed in line 128 downstream of injection system 168.

In general, system 100 operates as follows. Homogenization system 106 receives a flow of liquid fuel from source 108 (via gas processor 104, together with unused homogenous fuel mixture recirculated from engine 136) and a controlled flow of gaseous component from source 110. Liquid fuel is suitably provided from source 108 in accordance with engine demand (e.g., as reflected by the level of fuel in gas processor 104). The flow of gaseous component from source 110 is suitably provided under control of controller 144 in proportion to the flow of liquid fuel. Controller 144 suitably receives indicia of operational parameters and generates the necessary control signals to control the ratio of gaseous component to liquid fuel (in accordance with a predetermined formula or algorithm). In certain embodiments, the volumetric flow of liquid fuel from source 108 is actively controlled by controller 144. In alternative embodiments (an example of which will be described in connection with FIGS. 4-6), the volumetric flow of liquid fuel from source 108 is sensed (e.g., as by sensor 180) and indicia provided to controller 144, but the liquid fuel is supplied in a conventional manner.

Homogenization system 106 effectively mixes the liquid fuel and gaseous components under pressure to form the pressurized homogenous fuel mixture. This fuel mixture is characterized by the gaseous component being infused into the liquid fuel, with the gaseous component at predetermined relative percentages and at least at a minimum level of homogeneity. In operation (typically when engine 136 is running), a relatively continuous flow of homogenized fuel is supplied under relatively high pressure to injector pump 166 independently of the demands of engine 136. Pump 166 directs a portion of the pressurized homogenous fuel flow to injection system 168 under increased pressure, in accordance with engine demand (e.g. accelerator position). The portion of the pressurized homogenized fuel flow that is not provided to injection system 168 by pump 166 is returned via a bypass valve (not shown, often integral to pump 166) to line 126 for recirculation in homogenization system 106. In some cases, provisions to adjust either the inlet pressure or back pressure of injector pump 166 may be desirable. For example, a re-pressurization pump (700, shown in FIG. 7) may be interposed in line 126 to adjust (e.g., decrease) backpressure on pump 166, or a pressure regulator (701, shown in FIG. 7A) interposed in line 126 to adjust (e.g., increase) the inlet pressure to pump 166.

A portion of the highly pressurized homogeneous fuel mixture provided to the injection system 168 is injected into the engine combustion chamber. As will be further discussed, upon injection into the combustion chamber the gaseous component of the highly pressurized homogeneous fuel mixture rapidly expands, atomizing the liquid fuel (and typically encouraging free radical combustion and adiabatic cooling) providing for not only more efficient operation of engine 136, but also reduced engine emissions.

Not all of the fuel mixture provided to injection system 168 is injected into the engine cylinders; a portion of the fuel mixture remains unused after the fuel is fed to the injectors of engine 136. Depending upon the sensitivity of injection system 168 to back pressure, the unused homogenized homogeneous fuel is conducted from injection system 168 to gas processor 104 via return line 128 (as shown in FIG. 1), or (if capable of accommodating the back-pressure) to line 126.

Gas processor 104 (and pressure regulator 172, if employed) establishes the back pressure from return line 128 at a relatively low predetermined value pressure suitable for the affected components (e.g., injection system 168) and, as necessary, provides for outgassing of the gaseous component in the unused homogenized fuel to condition the fuel for introduction into homogenization system 106 together with unaltered liquid fuel from source 108 at relatively low pressure. In the embodiment of FIG. 1, the liquid fuel from line 114 is mixed at juncture 130 with the unused homogeneous fuel to form an unused homogenous fuel-liquid fuel mixture that is fed into gas processor 104. The outgassed gaseous component released from the blend of fuels in gas processor 104 is conducted to the engine air intake through line 134.

Controller 144 may be any device or system capable of receiving indicia of various operating parameters and generating the control signals necessary to maintain the ratio of gaseous component to liquid fuel in accordance with a predetermined formula or algorithm. Controller 144 may comprise, e.g., respective timer relays, logic devices and counters, or a microcontroller or microprocessor-based unit, programmed in accordance with conventional techniques.

Homogenization system 106 may be any system that effectively mixes the liquid and gas components, and maintains the mixture at least at a minimum level of homogeneity. Homogenization system 106 suitably receives: a controlled flow of gaseous component from source 110 through line 118; a flow of mixed liquid fuel from source 108 and partially outgassed unused fuel (from engine 136) from gas processor 104 as described below through line 116; and a flow of unused homogenized fuel mixture from pump 166 through line 126, suitably provides a pressurized homogenous liquid-gaseous fuel mixture to engine 136 at a predetermined pressure, (typically relatively high) through line 176. In the particular example of system 100 shown in FIG. 1, homogenization system 106 circulates (independently of engine demand) a liquid-gas fuel mixture under pressure through a predetermined volume (also referred to as an infusion volume) to uniformly distribute the gaseous component throughout the mixture in relatively small uniformly sized bubbles. That is, the gaseous component infuses in the liquid fuel within the infusion volume to establish and maintain the homogeneity of the mixture. As is further described below, homogenization system 106 may provide the infusion volume utilizing one or more infusion tubes.

In general, it is desirable that the pressure maintained in the infusion volume of system 106 be as high as practicable; the higher the pressure the greater the potential saturation of the gaseous component into the liquid fuel. The circulation through the infusion volume is typically effected at a predetermined pressure, ranging from 100 to 2000 psi. When used with conventional common rail injection systems, the pressure is suitably within the range of from 180 to 360 psi. The homogenous liquid-gas fuel mixture is typically provided to engine 136 at a pressure somewhat higher than the circulation pressure, e.g., at a pressure ranging from 30 to 60% greater than the circulation pressure. However, as will be discussed, the relatively high-pressure operation of homogenization system 106 can cause stresses on various engine components. Gas processor 104 (and, as will also be discussed, in some instances, certain other components) help to reduce or ameliorate these stresses and attendant malfunctions.

More particularly, the characteristics of the liquid-gas fuel mixture and the pressures employed to create the pressurized homogenous fuel mixture in system 106 create a likelihood of back pressures in certain regions of the system 100 that are higher than conventional values. These relatively high back pressures can cause engine component noise and stress that can damage engine 136 and make the engine run unevenly, resulting in less-than-optimal efficiencies. For example, the fuel injectors of a common-rail internal combustion engine (e.g., non-piezo crystal fuel injectors) can be particularly sensitive to high back pressures and will not run properly if back pressures are too high, e.g., significantly above manufacturer rated values. Flow regulating solenoid valves of the type typically used in injection systems, as well as other components, likewise tend to be particularly sensitive to high back pressure. In general, as used herein, components are considered to be "sensitive" if the components do not function as anticipated at other than manufacturer specified pressures that they might be exposed to in the context of system 100.

Sometimes, operating pressures within system 100 can be adjusted sufficiently to reduce the back pressure to a level better tolerated by the components. Such adjustment of the operating pressures, however, can itself result in sub-optimal performance of the system. For example, some components (e.g., flow regulators on the injector pump of a 2009 Volkswagen Jetta TDI,) tend to malfunction when exposed to a back pressure of about 50 psi. Therefore, gas processor 104 is provided to aid in releasing back pressure from those system components that are sensitive to back pressure.

Unused fuel from engine components that are less sensitive to higher back pressures (e.g. pump 166) are suitably returned directly (e.g. line 126) to the high pressure region of homogenization system 106. However return lines from components that are sensitive to higher back pressures are passed through gas processor 104 to a low pressure region of homogenization system 106 (e.g., the inlet of pump 102). Gas processor 104 may comprise any mechanism capable of pressure management of those return lines sensitive to high pressures, bringing the fuel to a predetermined pressure (e.g., ambient or some relatively low pressure value optimum for those components) downstream of the engine to avoid harmful back pressure on sensitive components; and conditioning the now low pressure fuel to make it suitable for introduction to the low pressure region of homogenization system 106, e.g., permitting the component of the unused homogeneous fuel mixture to out-gas (dissipate), so that the recirculated partially outgassed fuel mixture does not cause cavitation in pumps designed for use with relatively low pressure liquid fuel.

In other words, to accommodate the sensitivity of the various engine components to back pressure, the unused homogeneous fuel returned from engine 136 is brought to a relatively low pressure. It is undesirable to return such gas infused liquid fuel to liquid fuel source 108; in many cases, the ultimate release of the component could present a safety hazard. Such unused fuel is therefore introduced into a low pressure of region of homogenization system 106 (e.g., the region that receives the unaltered liquid fuel from source 108) for re-pressurization. However, application of gas infused fuel to pumps designed to operate upon relatively incompressible unmodified liquid fuel (e.g., pressurizing pump 102 as will be described) tends to cause cavitation in the pumps. Cavitation can cause a significant degradation of pump performance, often resulting in fluctuating flow rate and discharge pressure, and in some cases causing damage to the internal components of the pump. To avoid this problem, gas processor 104 suitably holds unused homogeneous fuel exiting engine 136 resident at the predetermined low pressure for a period of time, sufficient under anticipated operating conditions (e.g. maximum rate of fuel consumption/flow) to permit outgassing of the gaseous component to an extent sufficient to lower the level of micro-bubbles in the liquid-gaseous fuel mixture to permit re-pressurization by the fuel system pumps (e.g., pump 102) without cavitation. In addition, in the embodiment of gas processor 104 depicted in FIG. 1 the partially outgassed unused homogeneous fuel is mixed with unaltered liquid fuel from source 108, to form the partially outgassed unused fuel-liquid fuel mixture held in gas processor 104, prior to reintroduction to homogenization system 106. The outgassed gaseous component is directed through gas outlet 218 (discussed in detail below with respect to FIG. 2) and line 134 to the air intake of engine 136.

Exemplary Embodiment of Homogenization System 106

More particularly, the exemplary homogenization system 106 shown in FIG. 1 comprises: an infusion volume 122, respective pumps 102, 138, 132 and 142, a suitable sensor 160, and respective lines 120, 140, 124, 176 and 126. In some cases it may also be desirable to include a bypass line 125 connected between lines 124, as shown in FIG. 1B. As will be discussed, pumps 102 and 138 and line 140 comprise a first portion of homogenization system 106 operating at relatively low pressures, pump 132, infusion volume 122, lines 120 and 124, (and line 125, if utilized) comprise a second portion of homogenization system 106 operating at an intermediate pressure, and pump 142 and line 176 comprise a third portion of homogenization system 106 operating at a relatively high pressure. If desired, as will be discussed in conjunction with FIG. 7-10, provisions can be made to avoid depressurization of (and loss of gaseous component from) homogenization system 106 when engine 136 is shut off.

Pump 102 receives the primarily liquid fuel from source 108 (and the low pressure fuel returned from gas processor 104) and provides it to homogenization system 106, increasing the pressure of the substantially liquid fuel to a level (e.g., in the range of 60 to 200 PSI) more suitable to accommodate the introduction of gaseous fuel component from line 118. Pump 102 may comprise any fluid pump designed for appropriate pressures and power draw operating upon substantially liquid fuel having the characteristics of the liquid fuel provided by source 108, e.g., diesel or other oil fuels. Suitable pumps include, e.g., gear, rotary vane, roller vane pumps or other positive displacement pumps. If desired, one or more such pumps may be multi-stage, ganged or placed in series to achieve the desired throughput and pressurization.

Pump 138 further increases the pressure of the liquid-gas fuel mixture to an intermediate level (e.g., in the range of 60 to 1950 PSI) between that provided by pump 102 and the pressure maintained in infusion volume 122 and having a predetermined relationship (e.g., approximating) the pressure in line 126. Pump 138 may comprise any positive displacement fluid pump designed for appropriate pressures and power draw operating upon a non-homogeneous mixture of the particular gaseous component and liquid fuel.

Pump 132 provides for circulation of the liquid-gaseous fuel mixture through infusion volume 122, at a predetermined pressure intermediate of the pressure of the liquid fuel delivered from liquid fuel source 108 and the pressure of the homogenous liquid-gaseous fuel mixture delivered to engine 136 (e.g., in the range of 100-1970 PSI). Circulation pump 132 suitably comprises one or more positive displacement pumps disposed serially and/or in parallel within the flow path. Disposing plural pumps in parallel tends to reduce cavitation in conjunction with pumping the pressurized liquid-gaseous fuel mixture.

Infusion volume 122 comprises a body defining an interior volume through which liquid-gaseous fuel must pass. Infusion volume 122 may comprise one or more infusion tubes, connected in series. Suitable infusion tubes are described below in connection with FIGS. 12-14.

Sensor 160 suitably generates a signal indicative of a particular characteristic of the fuel mixture such as, for example, the relative amounts of liquid and gas or the degree of homogeneity of the liquid-gaseous mixture. Sensor 160 may be, e.g., an opacity sensor. Alternatively, sensor 160 maybe a flow meter: the speed of the fuel mixture exiting infusion volume 122 changes in accordance with the relative proportions of gas and liquid in the mixture. The sensor signal (162) is applied to controller 144, and employed in connection with generating control signal (164) to gaseous component flow control device 112.

Pressurizing pump 142 is utilized to bring the pressure of the homogeneous fuel mixture up to a sufficiently high pressure (e.g., in the range of 150 to 2000 PSI) to homogenize the fuel mixture, ensuring that the bubbles of gaseous component are microscopic and avoid cavitation in the operation of the high-pressure injection pump 166. Pump 142 suitably comprises one or more displacement pumps disposed serially and/or in parallel within the flow path.

In the operation of system 100 using the exemplary homogenization system 106 depicted in FIG. 1, controller 144 suitably receives indicia of operational parameters and generates the control signals necessary to maintain the ratio of gaseous component to liquid fuel in accordance with a predetermined formula. More particularly, gas processor 104 generates a control signal (154) to controller 144 generally indicative of a predetermined amount of fuel consumption (e.g., that the level of fuel in gas processor 104 has dropped to below a predetermined level) controller 144 responsively generates control signals (164) to flow control device 112 (associated with source 110) and flow control device 178 (associated with source 108) causing respective predetermined amounts of liquid fuel and gaseous component to be introduced into system 100. This is suitably done by actuating flow control devices 112 and 178 for respective time periods corresponding to the predetermined amount of associated fluid to be introduced into the system. Alternatively, control devices 112 and 178 can be actuated to allow lower or higher flow rates of their respective fuels in order to maintain a suitable ratio of gaseous component to liquid fuel in accordance with a predetermined formula. As will be discussed, even in applications where engine 136 does not include any back-pressure sensitive components, the arrangement whereby gas processor is disposed (e.g., interposed between liquid fuel source 108 and the first (low pressure) portion of homogenization system 106) to generate a control signal (154) to controller 144 generally indicative of a predetermined amount of fuel consumption provides a particularly advantageous control system. In such an application, all of the fuel mixture supplied to, but unused by, engine 136 may be returned to fuel enhancement system 100 from engine 136 through line 126, and direct communication between engine 136 and gas processor 104 omitted (e.g., the output of injection system 168 would be directed to line 126 rather than to juncture 130).

Liquid fuel from source 108 (with outgassed unused fuel mixture from engine 136), is fed from gas processor 104 through line 116 to homogenization system 106. Line 116 is at relatively low pressure (e.g., ambient). Pressurization pump 102 increases the pressure of the essentially liquid fuel to a predetermined level (e.g., 60 psi) and the liquid fuel is mixed with gaseous component from source 110 provided through line 118 at a predetermined pressure (e.g., 120 psi) greater than that provided by pump 102.

The gaseous component from source 110 is effectively metered into the mixture to maintain a predetermined ratio of gas to liquid and/or level of homogeneity. In this embodiment, controller 144 receives a signal (154) indicative of consumption of a predetermined amount of fuel by engine 136 and responsively generates a control signal (158) to flow control device associated with liquid fuel source 108 and a control signal (164) to flow control device 112 associated with gaseous component source 110, causing respective predetermined amounts of liquid fuel and gaseous component to be dispensed in accordance with a predetermined formula, e.g., 70 sccm of gaseous component (compressed in accordance with system pressures) per 0.02 gallon of liquid fuel. At system pressures, the volume of gaseous component is compressed and is relatively low compared to the volume of liquid fuel.

Controller 144 is suitably a microcontroller, programmable logic controller, or microprocessor based unit, programmed in accordance with conventional techniques. Upon receipt of signal (154) at one of the input pins thereof, the microcontroller would provide signals at designated output pins corresponding to transmission paths 158 and 164, and would initiate a timer count. The signals at the output pins would be disabled when the timer reached respective predetermined counts corresponding to predetermined "pulse" durations. The duration of the control signal (158) pulse corresponds to the period of time that it would take for a predetermined volume of liquid fuel (e.g., 0.02 gallon) to flow through device 178. The duration of control signal (164) corresponds to the period of time that it would take for a predetermined volume of gaseous component (e.g., 70 sccm) to flow through device 112.

If desired, the predetermined amount of gaseous component dispensed can be adjusted in accordance with signal (162) from sensor 160, e.g., temporarily reduced or disabled if a specified characteristic of the mixture falls outside of limits, e.g., if the percentage of gas in the fuel mixture exceeds a predetermined level. The count corresponding to the duration of signal (164) could be adjusted upwardly or downwardly in accordance with signal (162) from sensor 160. Thus, in such an embodiment, the gaseous component is effectively provided to system 100 in periodic "pulses" with the frequency (interval between instances) of the pulses being in accordance with the flow of liquid fuel, and the amount of gaseous component injected in each pulse (the duration of the pulse) being adjusted in accordance with the signal from sensor 160.

Figure 1A:
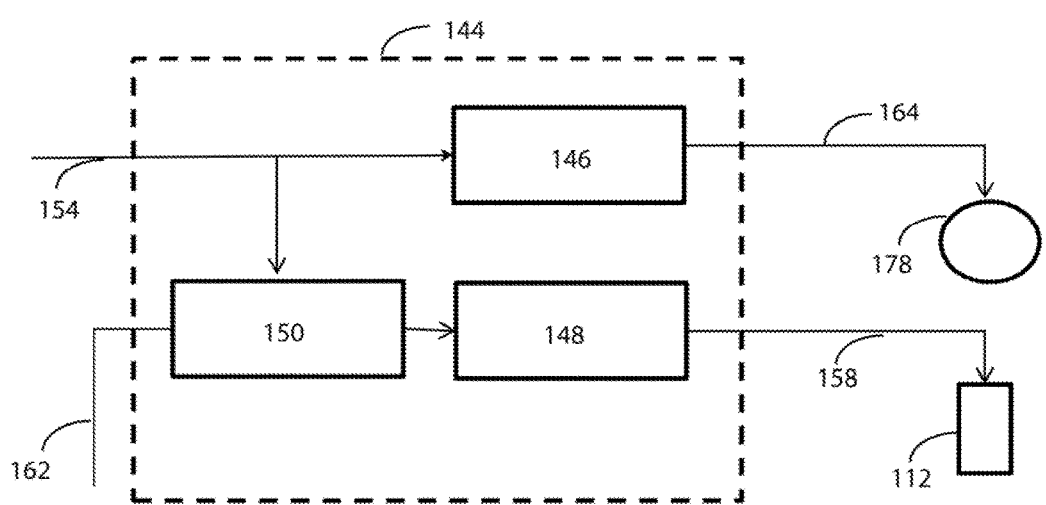
FIG. 1A is simplified block schematic of a controller suitable for use in the system of FIG. 1.
Figure 1:
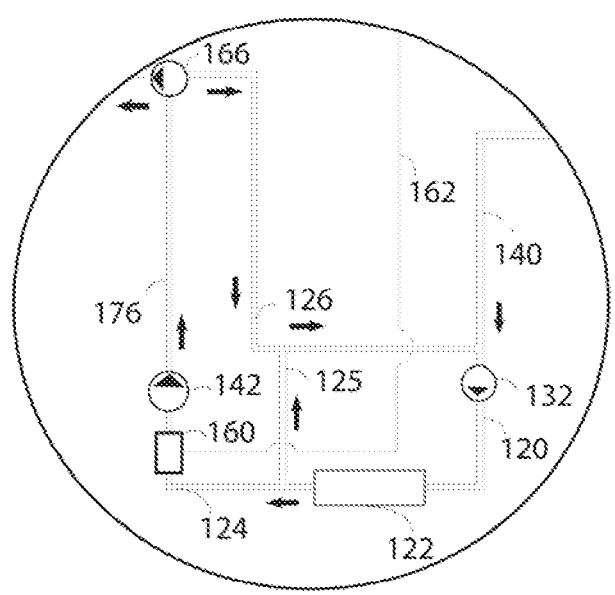

Alternatively, controller 144 may be implemented using respective discrete timer relays adapted to produce, when actuated, an output signal for a predetermined period of time. For example, referring briefly to FIG. 1A, controller 144 may be implemented using respective timer relays 146 and 148, both actuated by signal (154). Relay timer 146, when actuated by signal (154) generates a pulse of predetermined duration as control signal (158) to flow control device (e.g., lift pump) 178. The duration of control signal (158) corresponds to the period of time that it would take for a predetermined volume of liquid fuel (e.g., 0.02 gallon) to flow through device 178. Similarly, when actuated by signal (154), relay timer 148 generates a pulse of predetermined duration as control signal (164) to flow control device (e.g., solenoid valve) 112. The duration of control signal (164) corresponds to the period of time that it would take for a predetermined volume of gaseous component (e.g., 70 sccm) to flow through device 112.

Here too, the predetermined amount of gaseous component dispensed can, (if desired,) be adjusted in accordance with signal (162) from sensor 160. A relay switch 150 is interposed before timer relay 148 to inhibit timer relay 148 (and thus flow control device 112) during such periods that signal (162) indicates the specified characteristic of the mixture is outside of limits.

Referring again to FIG. 1, after the gaseous component is introduced into the primarily liquid fuel, the mixture passes through pressurization pump 138 to further increase the pressure (in line 140) to a predetermined level (e.g., 70 psi) and is then mixed with the return (line 126) of unused substantially homogenous fuel mix from engine 136 (e.g., circulated fuel that bypassed injection pump 166 rather than being applied to injection system 168). The pressure is further increased to a predetermined level (e.g., 90 psi) by circulation pump 132 and the mixture is applied (line 120) to an infusion volume 122 in which the gaseous fuel infuses into the liquid fuel. Infusion volume 122 is configured to mix and extend the infusion residence time of the circulating liquid-gas fuel mixture thereby causing the mixture to become relatively more homogeneous. Further details of infusion tubes 122 are provided below with respect to FIGS. 12-14.

Sensor 160, disposed in line 124 to receive the homogenous fuel exiting infusion tubes 122, generates a signal (162) indicative of a particular characteristic of the liquid-gas mixture being fed to engine 136 such as, for example, the relative amounts of liquid and gas or the degree of homogeneity of the liquid-gaseous mixture (such as, e.g., an opacity sensor). As previously noted, signal (162) is utilized as a control signal to controller 144 which accordingly generates control signals to flow control device 112 to adjust the amount of gaseous component injected into system 106.

Pressurizing pump 142 raises the pressure of the homogeneous liquid-gas fuel mixture to a level suitable for application (line 176) to high pressure injection pump 166 of engine 136, i.e., a pressure sufficiently high to micro-size the bubbles of gaseous component in the mixture to avoid cavitation.

In the embodiment of FIG. 1, pumps 132 and 142, and lines 120, 124, 176, and 126 (together with the bypass valve of pump 166, and bypass line 125, if utilized) effectively form a circulation loop through which the unused homogeneous liquid-gaseous fuel mixture not applied to injection system 168 by pump 166 is recirculated at pressure through infusion volume 122. The amount of fuel mixture flowing through 166 to line 126 tends to vary depending upon the type of engine and type of pump 166 utilized. In some cases there is relatively little flow through injector pump 166 into line 126. This tends to create a significant back pressure on pump 132, and to limit recirculation flow through infusion volume 122. In those cases, in particular, it is desirable to include bypass line 125 (FIG. 1B) connected between lines 124 and 126. Bypass line 125 reduces back pressure on circulation pump 132, tending to provide more efficient operation of, and minimizing wear on, pump 132. Bypass line 125 also permits more liquid-gaseous fuel mixture to be recirculated through infusion volume 122 than is supplied to engine 136 (i.e., injector pump 166) or flows through injector pump 166, tending to ameliorate potential flow restrictions that would otherwise be imposed by the particular pump 166 utilized.

As previously noted, substantial homogeneity of the gaseous component in the liquid fuel encourages the free radical combustion, atomization, and other enhancements when injected into the combustion chamber. With a homogeneous fuel mixture, the gaseous component expands upon injection, but the liquid fuel does not, promoting atomization. In the injection event, the gaseous component expands within the liquid, resulting in a starburst effect. In addition, a cooling effect occurs upon injection from the expanding gaseous component. Some types of gas components have greater adiabatic effect than others. And, to an extent, the pre-combustion combustion chamber pressure is increased, as the compressed gaseous component expands as it is being released from the very high pressures of the injection system. All of these effects promote engine efficiency, and tend to reduce emissions.

First Embodiment of Gas Processor 104

Figure 2:
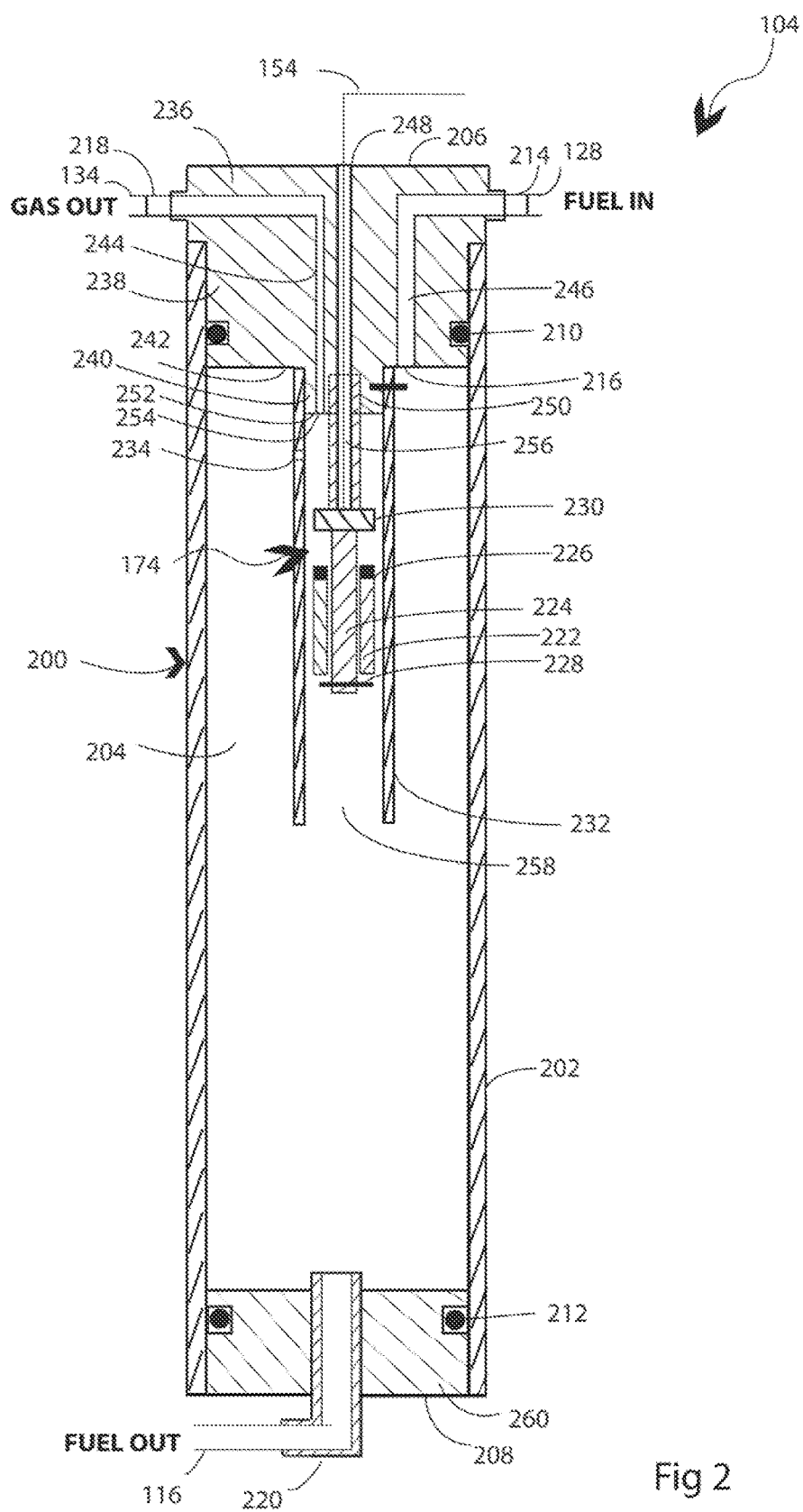
FIG. 2 is a sectional view of a first embodiment of a gas processor suitable for use in the system of FIG. 1.

Referring now to FIG. 1 and FIG. 2 a first embodiment of device 104 (FIG. 1) configured for use as a gas processor suitably comprises: a body 200 defining an interior volume 204; a fuel level detector assembly 174 disposed within the interior volume 204; a fuel inlet 214, gas outlet 218 and a fuel outlet 220. Fuel inlet 214, gas outlet 218, and fuel outlet 220 suitably provide fluid communication between with interior volume 204 and lines 114 (from fuel source 108) and 128 (from engine 136) (FIG. 1), line 134 (to the air intake of engine 136) and line 116 (FIG. 1), respectively. In general, liquid fuel from source 108 and unused homogeneous fuel recycled from engine 136 is introduced into interior volume 204 through fuel inlet 214, wherein a predetermined relatively low pressure is established and the fuel mixture resides the predetermined low pressure for at least a period of time sufficient under anticipated operating conditions to permit outgassing of the gaseous component (through gas outlet 218) to an extent sufficient to lower the level of micro-bubbles in the mixture exiting fuel outlet 220 to permit repressurization by the fuel system pumps (e.g., pump 102) without cavitation. The outgassed gaseous component is directed to the air intake of engine 136. As will be described, gas processor 104 may, if desired, also include provisions for preventing liquid fuel from exiting through gas outlet 218.

Body 200 can be made of any material that is compatible with the liquid fuels (e.g., petrochemicals) and the gaseous components contemplated herein, and can be of any configuration that provides a suitable interior volume, inputs and outputs, and can be mounted in the space available. Examples of materials of which body 200 can be made include, but are not limited to, metals or plastics, so long as the metals and/or plastics do not chemically react with the e.g., petrochemicals in the systems.

In the embodiment of FIG. 2, body 200 comprises a hollow cylindrical tube 202 of predetermined diameter and length, cooperating with top and bottom end caps 206 and 208. The length is preferably at least twice the diameter. End caps 206 and 208 are suitably sealed against body 202 by first and second o-rings 210 and 212, respectively. Fuel inlet 214 and gas outlet 218, are suitably provided in top end cap 206 and fuel outlet 220 is suitably provided in bottom end cap. Disposition of fuel inlet 214 and a gas outlet 218 in top end cap 206 provides communication between fuel inlet 214 and gas outlet 218 through internal volume 204. In the absence of a pressure regulator in line 128, this effectively brings the pressure in line 128 to atmospheric pressure.

Top end cap 206 suitably comprises a generally cylindrical body 236 having a predetermined diameter (suitably equal to or greater than the outer diameter of tube 202), a stepped down diameter portion 238 closely conforming to the interior diameter of tube 202, a smaller diameter cylindrical extension 240 (preferably coaxial), a bottom edge 242 and respective passageways 244, 246 and 248. Additional passageways through end cap 206 may be provided to accommodate, e.g., additional fuel inlets. Stepped down diameter portion 238 is preferably centrally disposed (e.g., coaxial) on body 236 extending upwardly a predetermined distance from the bottom edge 242, adapted to be closely received within the interior of tube 202, and in cooperation with o-ring 210 sealingly fixed therein. Cylindrical extension 240 is likewise preferably centrally disposed, and suitably of a predetermined diameter, and disposed on the bottom surface 242, extending downwardly a predetermined distance into the interior of tube 202 and having a bottom surface 252. The ratio of height to diameter of extension 240 is suitably approximately 4 to 1. As will be explained, extension 240 supports fuel level detector assembly 174, and suitably includes a central cylindrical recess 250 extending upwardly from bottom surface 252 for that purpose. Passageway 244 provides fluid communication between gas outlet 218 and interior volume 204; in the embodiment of FIG. 2, passageway 244 terminates in an opening 254 on the bottom surface 252 of extension 240. Passageway 246 provides fluid communication between fuel inlet 214 and interior volume 204, preferably terminating in an opening 216 in bottom surface 242. Passageway 248 provides a line through which electrical connections can be made to fuel level detector assembly 174.

Fuel is introduced into gas processor 104 from line 128 through fuel inlet 214. While FIG. 2 depicts only one fuel inlet 214, it is contemplated that top end cap 206 can include multiple fuel inlets 214 communicating with interior volume 204 through one or more (individual or interconnected) passageways 246. In the embodiments in which top end cap 206 has multiple fuel inlets 214, at least one of multiple fuel inlets 214 supplies unaltered liquid fuel to gas processor 104 (for example, from line 114 of FIG. 1) and at least another fuel inlet supplies unused homogeneous fuel from the engine to gas processor 104 (for example from line 128 of FIG. 1). In this case, the liquid fuel and the unused homogeneous fuel are mixed within gas processor 104. In the embodiments (such as that shown in FIG. 1) in which only one fuel inlet 214 is present in top end cap 206, the homogeneous fuel and the liquid fuel are mixed in-line at junction 130 prior to being fed to gas processor 104.

Gas outlet 218, in cooperation with passageway 244, provides an exit for outgassed gaseous component from the unused homogeneous fuel. The outgassed component is suitably directed to the air intake of engine 136 by line 134. As will be discussed, passageway 244 suitably opens into interior volume 204 (on surface 252 of extension 240) within the confines of an anti-slosh tube, to help prevent entry of liquid fuel.

In applications where engine 136 does not include any components returning fuel mixture to the system that require back-pressure management, and device 104 is effectively employed as a sensor to generate signals indicative of liquid fuel flow to controller 144, device 104 would typically include a single fuel inlet 214, and gas outlet 218 would simply serve as a vent.

Bottom end cap 208 suitably comprises a generally cylindrical body 260 having a predetermined diameter closely conforming to the interior diameter of tube 202. Fuel outlet 220, suitably extends through bottom end cap 208 to provide fluid communication with interior volume 204 such that the mixture of unaltered liquid fuel and partially outgassed unused fuel exit gas processor 104 and are directed through line 116 to homogenizing system 106.

As noted above, gas processor 104 is configured such that the unused homogeneous liquid-gaseous fuel exiting engine 136 is held resident in interior volume 204 for at least a time, sufficient under anticipated operating conditions (e.g. rate of fuel consumption/flow) to permit outgassing of the gaseous component to an extent sufficient to permit repressurization by circulation pump 102 without cavitation issues. Factors that are suitably considered in determining the desired residence time include, e.g., the anticipated volume of return flow from injection system 168; the anticipated volume of return flow from the capillary bleed (if employed) of injection pump 166; pressure in line 116; and the temperature of return flow. By way of non-limiting example, such residence time is suitably on the order of from 2-20 seconds, although residence times outside of that range are contemplated in certain types of systems.

Factors that contribute to retaining the fuel mixture within interior volume 204 for the desired residence time include: the size of volume 204, the diameters of outlet 220 and return line 116, and the pressure maintained at fuel outlet 220 (e.g., the pressure in line 116)

In addition to the desired residence time, a number of other factors are suitably considered in determining a suitable volume 204 in gas processor 104. These factors include, e.g., the anticipated volume of return flow from injection system 168: the anticipated volume of return flow from the capillary bleed (if employed) of injection pump 166; pressure in line 116; the temperature of return flow; and back flow from engine 136 when it is turned off. In addition, volume 204 is suitably configured to ensure (in cooperation with level detector assembly 174, as will be discussed) adequate open space in volume 204 above the surface of the retained fuel mixture (e.g., above magnetic switch 230) to accommodate outgassing of the gaseous component from the mixture. The airspace also presents a relatively low pressure (e.g., atmosphere) to fuel input 214, and thus lines 128 and 114, and effectively provides a low back pressure on those lines, and thus to the pressure sensitive components.

Internal volume 204 of gas processor 104 generally ranges from about 1 liter to about 25 liters. For diesel engines having displacements in the range used in most road vehicles, the volume 204 of gas processor 104 ranges from about 1 liter to about 10 liters; in many passenger vehicles the volume of gas processor 104 is suitably about 1 liter. Volumes larger than 10 liters, and in some cases larger than 25 liters, may be used in connection with various applications, such as, e.g., marine engines, locomotives, and stationary diesel engines. Volumes less than 1 liter, may be also used in connection with various applications, such as, e.g., small engine gen-sets.

Fuel level detector assembly 174 is responsive to the level of liquid in gas processor 104 in order to maintain proper volumes of liquid fuel and airspace within gas processor 104. In the embodiment of FIG. 2, fuel level detector assembly 174 suitably comprises a float and magnet assembly 222 (communicating with transmission path 154), a guide shaft 224, and an anti-slosh tube 232. In general, float and magnet assembly 222 is disposed on guide shaft 224 within the interior of anti-slosh tube 232 and actuated or deactivated to generate a control signal (154) depending upon the level of liquid fuel in interior volume 204, maintaining the level of liquid fuel in volume 204 within a predetermined range. Anti-slosh tube 232 is employed to minimize the effects of transient changes in the level of the fuel interacting with float and magnet assembly 222 ("sloshing") caused by motion or momentary tilting of gas processor 104, such as might result from movement of a vehicle employing system 100 and to help prevent liquid fuel from entering passageway 244.

Guide shaft 224 and anti-slosh tube 232 are concentrically disposed, with guide shaft 224 within the interior of tube 232, attached to top end cap 206 (suitably detachably), and extending substantially vertically into interior volume 204. Guide shaft 224 is suitably received in recess 242 of extension 240, and includes an interior channel 256 communicating with passageway 248 of end cap 206 to facilitate electrical connection of wire 154 to float and magnet assembly 222. Anti-slosh tube 232 is suitably received on cylindrical extension 240, e.g., has a predetermined inner diameter generally corresponding to the diameter of extension 240 and the top end of tube 232 closely fits about extension 240. If desired, a securing device, such as, e.g., adhesive or a pin extending through a tube 232 into extension 240, can be utilized. As will be discussed, anti-slosh tube 232 extends downwardly a predetermined distance (suitably from e.g., 0.5 to 1.5 inch, and, in the embodiment of FIG. 2, approximately 0.5 inch) beyond guide shaft 224, and, particularly, float and magnet assembly 222.

Fluid communication between gas outlet 218 and the interior of anti-slosh tube 232 is provided by passageway 244. Anti-slosh tube 232 also suitably includes a passageway (gas vent passage) 234 to permit outgassed components from within volume 204 outside of tube 232 to pass into the interior of tube 232. Passageway 234 is of relatively small diameter and disposed a predetermined distance above float and magnet assembly 222, such that it permits passage of gas, but is unlikely to pass liquid fuel into the interior of tube 232. Disposition of the opening of passageway 244 within the interior of anti-slosh tube 232 tends to permit outgassed components to exit gas processor 104 through outlet 218, while preventing liquid fuel from entering the gaseous component outflow stream.

Float and magnet assembly 222 is disposed on guide shaft 224 within the interior of anti-slosh tube 232. Float and magnet assembly 222 suitably includes a magnetically actuated switch 230 cooperating with a floating magnetic element 226. Switch 230 is suitably disposed on guide shaft 224 at a predetermined axial position in accordance with a predetermined minimum level of liquid fuel (and preferably a predetermined distance below passageway 234 and the opening of passageway 244 in the bottom of extension 240). Floating magnetic element 226 is suitably cylindrical with a central axial bore and predetermined exterior diameter approaching the interior diameter of tube 232. Guide shaft 224 is journaled through the central bore of floating element 226, such that floating element 226 is slidably mounted on guide shaft 224 and changes axial position in accordance with the level of liquid in interior volume 204. If desired, a suitable retaining mechanism 228, such as, e.g., a retaining ring, spring clip or the like, can be employed to retain floating element 226 on shaft 224.

In general, floating magnetic element 226 moves axially along guide shaft 224 in accordance with the level of liquid in gas processor 104; when the fluid level in volume 204 (or more particularly, within anti-slosh tube 232) falls below a predetermined level, floating magnetic element 226 moved out of proximity of switch 230 such that control signal (154) is generated on transmission path 154 to initiate (via controller 144) activation of flow control device 178 (e.g., lift pump associated with liquid fuel source 108) to add a predetermined amount of liquid fuel to gas processor 104 (and actuation of flow control device 112 to add more gaseous component to the system). Thus, the position of magnetic switch 230 on guide shaft 224 effectively establishes the maximum (as well as the minimum) surface level of the liquid fuel within volume 204 (subject only to further input of unused homogeneous fuel from engine 136). That position is chosen, taking into account the predetermined amount of liquid fuel in each "pulse" provided by source 108 and the anticipated flow of recycled unused homogeneous fuel from engine 136): to provide sufficient distance from gas outlet opening 254 to avoid the possibility of liquid fuel entering into the gaseous component outflow stream through passageway 244 and potentially the air intake of engine 136; and to establish sufficient low pressure air space above the surface of the liquid fuel in gas processor 104 to accommodate outgassing of the gaseous component. The generation of control signal 154 to controller provides for a particularly advantageous control of system 100, even in the absence of a need for pressure management and/or outgassing of fuel mixture returned to homogenization system 106 from engine 136.

While, for example, in vehicular applications, movement of system 100 may cause the fuel to slosh within gas processor 104, anti-slosh inner tube 232 keeps transient splashing from causing significant motion of floating magnetic element 226 or entering the flow of outgassed gaseous component. Tube 232 is of relatively small interior diameter (suitably in the range of 1 to 1.5 inch, and in the embodiment of FIG. 2, approximately 1 inch) and of predetermined length (suitably in the range of 80 to 150 mm, and in the embodiment of FIG. 2, approximately 1.5 to 2 inch, with a distal opening 258. As noted above, anti-slosh tube 232 extends downwardly a predetermined distance (e.g., ½ inch) beyond guide shaft 224, and, particularly, float and magnet assembly 222, such that opening 258 is disposed below the anticipated surface level of the liquid fuel mixture retained in volume 204. The effect of sloshing is minimized by: (a) the fact that tube 232 extends beyond the surface of the liquid fuel in volume 204; (b) the relatively small diameter of tube 232 and (c) the relatively close fit between floating element 226 and the interior of tube 232. The relatively small diameter of tube 232 and disposition of opening 258 below the liquid fuel surface minimizes the effect of angular movement at the surface of the fuel mixture, e.g., tilt, sloshing or splashing, on the position of floating element 226. Since opening 254 of passageway 244 (connected to gas outlet 218) is disposed within the confines of tube 232, the relatively close fitting relationship between floating element 226 and the interior of tube 232 tends to prevent sloshing fuel from advancing beyond floating magnetic element 226 and entering passageway 244.

The flow of released gaseous component to the air intake of engine 136 is further isolated from the liquid fuel, by use of gas vent passage 234. In the embodiment of FIG. 2, the primary outgassing of the fuel takes place exterior to anti-slosh inner tube 232. Gas vent passage 234, through which gaseous component released from the fuel mixture in volume 204 enters the interior of tube 232 (and passageway 244), is disposed a predetermined distance float and magnet assembly 222, and thus the anticipated liquid fuel surface so that sloshing liquid fuel will not reach gas vent passage 234. Gas vent passage 234 is of relatively small diameter so that it can allow the passage of gaseous component, but does not allow liquid fuel to flow readily there-through. In addition, since the primary outgassing takes place outside anti-slosh inner tube 232, the pressure of outgassed component is greater outside anti-slosh inner tube than inside anti-slosh inner tube 232. Thus, the flow of outgassed component is from the exterior of anti-slosh inner tube 232 to the interior. The outgassed component rises within gas processor 104 to vent 234, passageway 244 and gas outlet 218, whereby the outgassed component is moved to the air intake of engine 136 by way of line 134.

Figure 3:
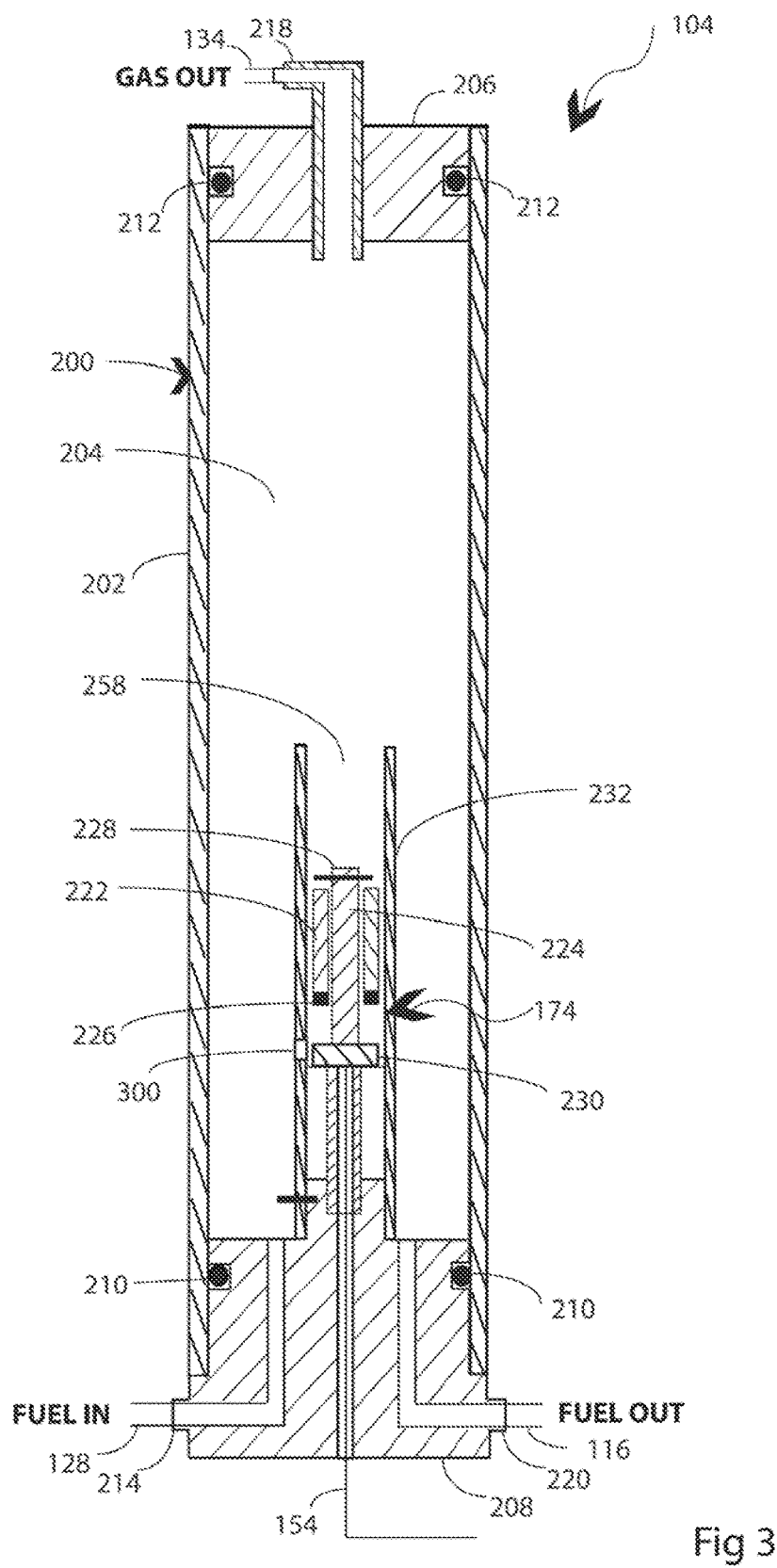
FIG. 3 is a sectional view of a second embodiment of a gas processor suitable for use in the system of FIG. 1.

If desired, fuel level detector assembly 174 can be positioned on the bottom of gas processor 104, as depicted in FIG. 3. The embodiment of gas processor 104 in FIG. 3 is substantially identical to the embodiment shown in FIG. 2 flipped 180°, except that the magnetic switching is reversed, fuel inlet 214 and fuel outlet 220 are disposed in bottom end cap 208, anti-slosh tube 232 extends upwardly such that distal opening 258 is disposed a predetermined distance above the anticipated surface level of the fuel mixture in volume 204 and gas vent passage 234 in tube 232 is replaced by a somewhat larger diameter passageway 300 (disposed below the anticipated surface level) to allow liquid fuel to traverse into and out of anti-slosh inner tube 232, thus, permitting the liquid fuel to act upon floating magnetic element 226. Gas outlet 218 suitably extends through end cap 206 into interior volume 204.

FIG. 1 depicts gas processor 104 being located in close vicinity to engine 136. The disposition of gas processor 104 in proximity to engine 136 is not critical. It is desirable, however, that gas processor 104 be mounted in a substantially vertical position. As previously noted, although movement of the vehicle, such as going up or down hills or even parking at an angle on a hill, can tilt gas processor 104 (and thus the surface of the fuel mixture within volume 204), level detector assembly 174 is able to accommodate tilts.

Alternative Embodiment of Gas Processor

Figure 4:
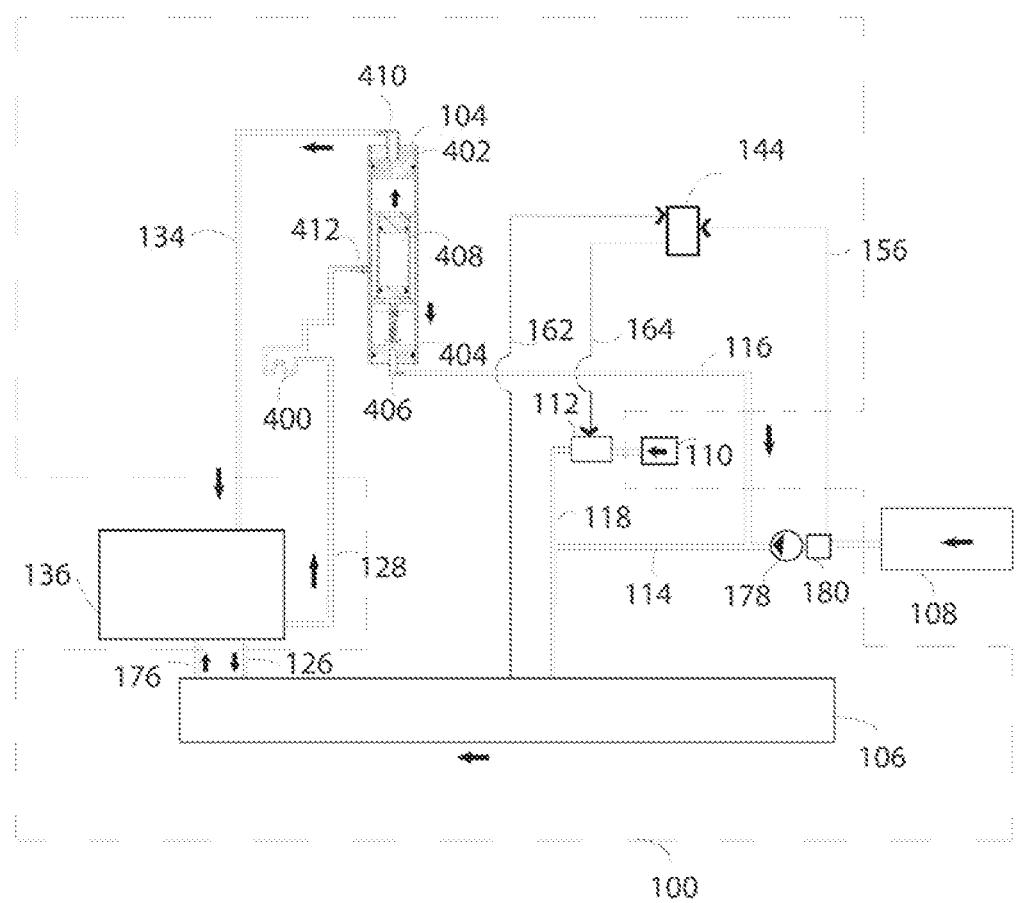
FIG. 4 is a simplified schematic drawing of another homogenizing fuel enhancement system utilizing another embodiment of a gas processor.
Figure 5:
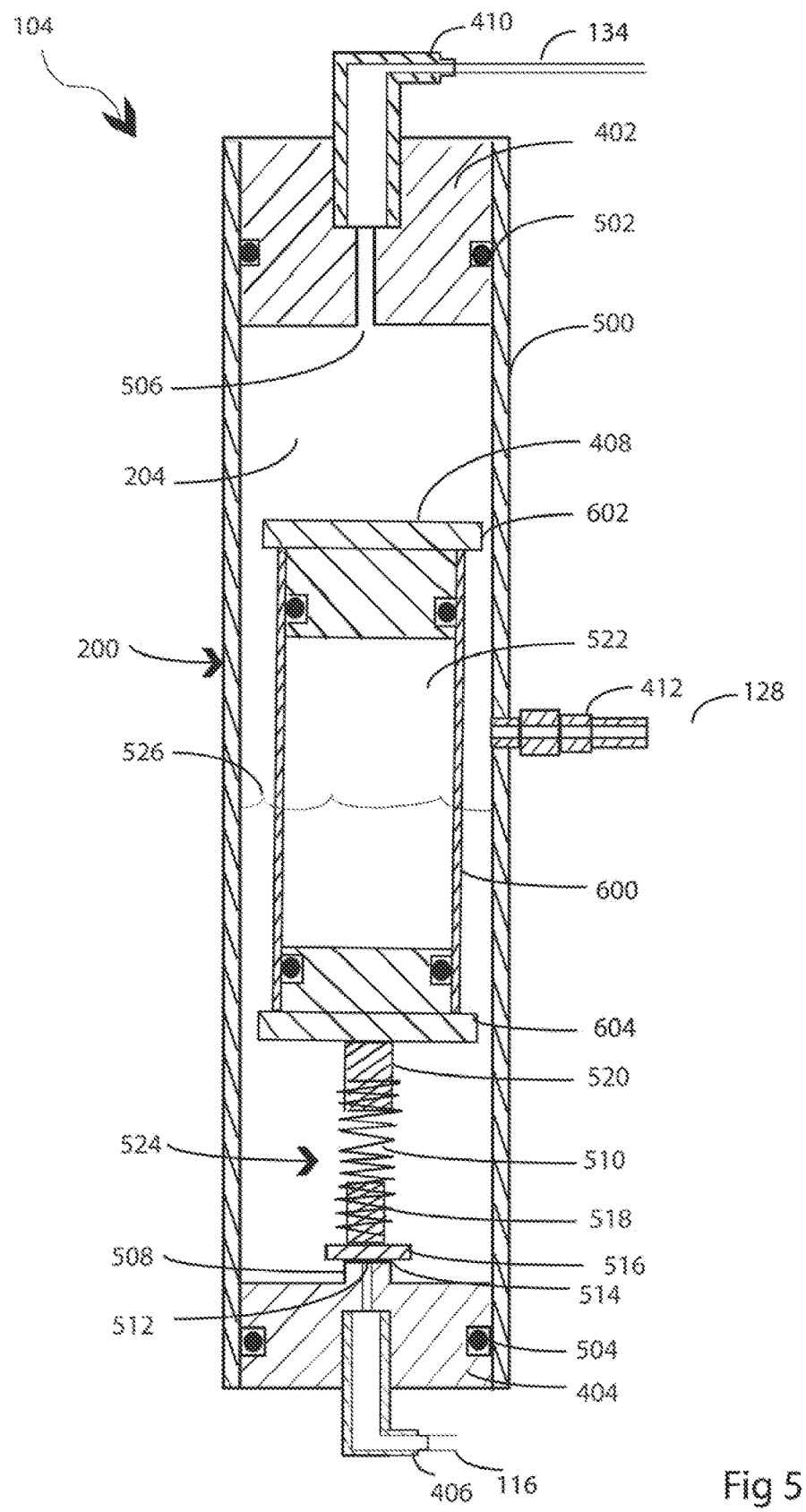
FIG. 5 is a cross-sectional representation of the gas processor of FIG. 4, with the fuel outlet plunger in the closed position.
Figure 6:
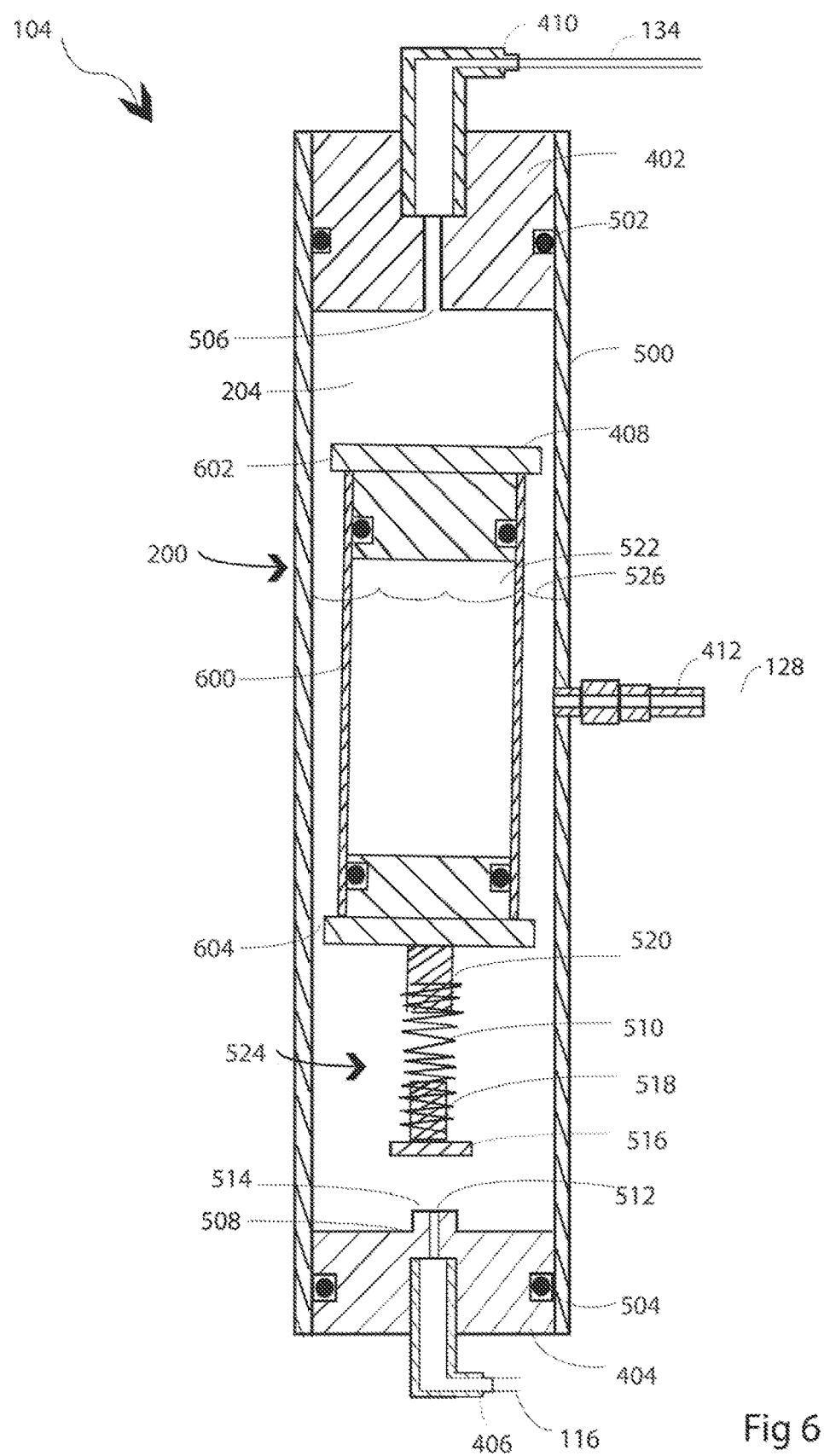
FIG. 6 is a cross-sectional representation of the gas processor of FIGS. 4 and 5, with the fuel outlet plunger in the open position.

In some applications, a purely mechanical gas processor is advantageous. A homogenizing fuel enhancement system 100 utilizing a mechanical gas processor 104 will now be described with reference to FIGS. 4-6. This embodiment of system 100 in FIG. 4-6 is very similar to the system depicted in FIG. 1, but utilizes mechanical gas processor 104 and a modified controller 144. In this embodiment, unaltered liquid fuel is supplied by source 108 employing a lift pump 178 in accordance with the demands of engine 136 in a conventional manner. As with respect to the embodiment of FIG. 1, controller 144 suitably receives indicia of fuel consumption, although in this case, signal (156) from flow sensor 180 and generates control signals (164) to gaseous component flow control device 112 such that the gaseous component is provided to system 100 in periodic "pulses" with the frequency (interval between instances) of the pulses being in accordance with the flow of liquid fuel. For example, controller 144, indicative of liquid fuel flow, suitably maintains a count indicative of cumulative units of liquid fuel flow, incremented responsive to signal (164) from flow sensor 180. When the count reaches a value corresponding to a predetermined amount of liquid fuel (e.g., 0.02 gallons), signal (164) is generated to flow control device 112 for a predetermined duration causing it to release a "pulse" of predetermined duration (i.e., a predetermined amount of) gaseous component into homogenization system 106 through line 118, and the cumulative fuel volume count is reset.

Controller 144 suitably comprises an appropriately programmed microcontroller. An internal count would be incremented in response to application of signal (164) from flow sensor 180 to a designated input pin. When the count reaches a predetermined number corresponding to the predetermined volume of liquid fuel (e.g., 0.02 gal), the microcontroller would provide a signal at a designated output pin corresponding to transmission paths 164, and would initiate a timer count. The signals at the output pin would be disabled when the timer reached the predetermined count corresponding to the desired "pulse" duration, i.e., the period of time that it would take for a predetermined volume of gaseous component (e.g., 70 sccm) to flow through device 112. If desired, as in the case of the embodiment of FIG. 1, controller 144 may also receive signals (162) indicative of, e.g., opacity, from sensor 160, and adjust the pulse duration count accordingly.

Figure 4A:
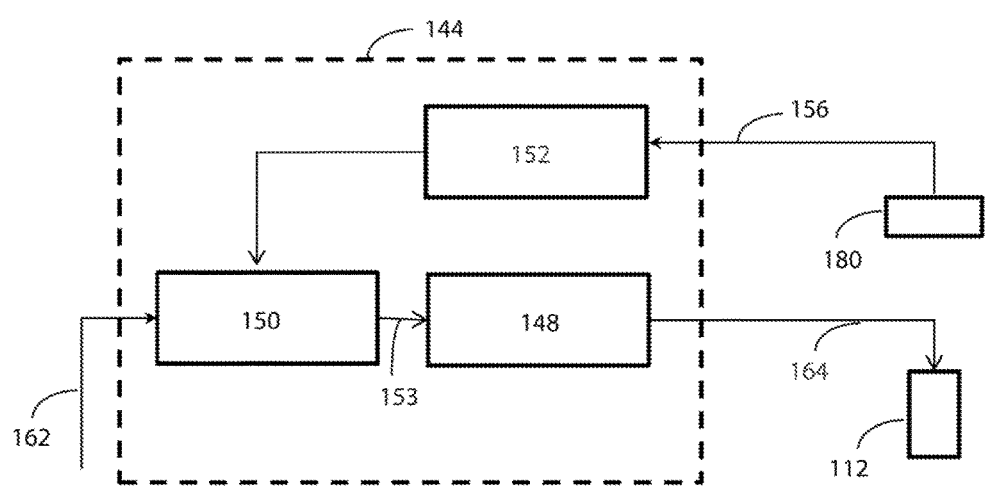
FIG. 4A is simplified block schematic of a controller suitable for use in the system of FIG. 4.

Alternatively, controller 144 can be implemented utilizing discrete components. For example, referring briefly to FIG. 4A, controller 144 may be implemented using a counter 152, adapted to be incremented by signals (156) from sensor 180, and to generate an output signal (153) when it reaches a count corresponding to the predetermined volume of liquid fuel (e.g., 0.02 gal). The output of counter 152 triggers a relay timer 148, causing it to generate a pulse of predetermined duration as control signal (164) to flow control device (e.g., solenoid valve) 112. The duration of control signal (164) corresponds to the period of time that it would take for a predetermined volume of gaseous component (e.g., 70 sccm) to flow through device 112. A relay switch 150 is interposed before timer relay 148 to inhibit timer relay 148 (and thus flow control device 112) during such periods that signal (162) indicates the specified characteristic of the liquid-gas mixture is outside of limits, e.g., an excessive amount of gaseous component in the mixture.

Referring again to FIG. 4, a heat exchanger 400 may be, if desired, interposed in line 128 between engine 136 and gas processor 104 to cool the unused homogeneous fuel mixture exiting engine. Such a heat exchanger may also be used in the embodiment of FIG. 1.

As best seen in FIGS. 5 and 6, gas processor 104 comprises a body 200 defining an interior volume 204; a float assembly 408 disposed within the interior volume 204; a fuel inlet 412, gas outlet 410 and a fuel outlet 406. Fuel inlet 412, gas outlet 410, and fuel outlet 406 suitably provide fluid communication between with interior volume 204 and line 128 (introducing the unused fuel from engine 136 into gas processor 104 for depressurization and outgassing), line 134 (directing the released gaseous component to the air intake of engine 136) and line 116 (directing the low pressure, de-gassed mixture to homogenization system 106 for recirculation), respectively. In general, float assembly 408 rises and falls within volume 204 in accordance with the level of liquid fuel in volume 204. When the volume of the liquid fuel is below a predetermined lower level, float assembly 408 is lowered to substantially close off fuel outlet 406 causing the fuel to accumulate within volume 204, as illustrated in FIG. 5. Once the volume of the fuel mixture reaches a predetermined upper level, float assembly 408 rises within volume 204, as illustrated in FIG. 6, clearing fuel outlet 220 and permitting flow of low pressure and degassed fuel through fuel outlet 406 to line 116 for recirculation in homogenization system 106. Float assembly 408 is configured, and the predetermined upper and lower levels chosen to ensure that the fuel is retained in volume 204 for the desired residence time.

Body 200 suitably comprises an outer tube 500 (analogous to tube 202) of predetermined length and diameter, sealed at its ends by a top end cap 402, and a bottom end cap 404. O-rings 502 and 504 are suitably employed for sealing. The length and diameter of tube 500 are chosen to establish a desired residence time, as previously described.

Fuel inlet 412 is suitably located in about a center position along the length of outer tube 500, preferably within the travel of float assembly 408. This allows the unused homogeneous fuel to tumble down along the wall of outer tube 500 as it enters gas processor, thereby aiding in the outgassing of the gaseous fuel from the unused homogeneous fuel, and float assembly 408 tends to prevent liquid fuel from splashing into gas outlet 410. However, it is contemplated that fuel inlet 412 can be positioned in other locations along outer tube 500 to help enhance optimization of the outgassing of the infused gaseous fuel from the liquid-gaseous fuel mixture.

End caps 402 and 404 suitably each comprise a generally cylindrical body having a predetermined diameter closely conforming to the interior diameter of tube 500. Gas outlet 410 is suitably located in top end cap 402, communicating with a passageway extending through the end cap body and terminating in an opening 506 into volume 204. Bottom end cap 404 suitably includes a smaller diameter cylindrical extension 508, preferably coaxially disposed extending upwardly a predetermined distance into volume 204 with an upper surface 514. Surface 514 is suitably of a predetermined configuration, e.g., flat, convex, or concave. Fuel outlet 406 is suitably located in bottom end cap 404, communicating with a passageway through bottom end cap 404 that terminates in an opening 512 into volume 204 in upper surface 514 of extension 508. Opening 512 is suitably of predetermined diameter and centrally disposed in surface 514.

Float assembly 408 suitably comprises a body 522, a foot 516 and, a structure 524 connecting foot 516 to body 522. Body 522 suitably manifests: a peripheral configuration generally conforming to the interior configuration of volume 204, e.g., is generally cylindrical with a diameter approaching the interior diameter of tube 500; a predetermined weight; and sufficient buoyancy relative to the unused homogenous fuel mixture received from engine 136 to float assembly 408 once the volume of the fuel mixture in volume 204 exceeds a predetermined level.

For example, float body 522 may comprise a hollow tube 600 cooperating with sealing end caps 602 and 604. Float body tube 600 is suitably of predetermined length and a diameter slightly less than the interior diameter of tube 500. End caps 602 and 604 are likewise cylindrical with a diameter greater than tube 600 approaching the inner diameter of tube 500, with a stepped down diameter portion that is sealingly received in the interior of float body tube 600. Respective O-rings can be used to improve the seal between tube 600 and end caps 602 and 604. Float assembly 408 and thus move vertically up and down within tube 500, but transverse motion and tilting within tube 500 is limited by the close relationship of the respective diameters.

Foot 516 is disposed and configured such that, when float assembly 408 is not sufficiently lifted by the fuel mixture in volume 204, it covers and substantially blocks opening 512, minimizing the amount of fuel mixture escaping volume 204. The bottom of foot 516 is suitably configured to mate with the upper surface of extension 508 of bottom end cap 404, e.g., flat, concave or convex. In some systems, substantial stoppage (as opposed to absolute stoppage) is desirable to avoid creation of suction that could make foot 516 difficult to dislodge from the mated position.

Connecting structure 524 may be, e.g., a simple shaft. In the embodiment of FIG. 4-6, structure 524 comprises a spring 510 with ends secured to the bottom of float body 522 and the top of foot 516. For example, spring 510 may be secured to respective posts 520 and 518 on the bottom of float body 522, and the top of foot 516, respectively. Spring 510 suitably is a predetermined length and has a spring coefficient sufficiently low that is compressed by the weight of body 522. Spring 510: maintains alignment between foot 516 and opening 512; dampens the movement of body 522, tending to prevent transient lifting due to, e.g., bumps entailed in vehicular movement; and establishes a certain amount of hysteresis whereby the lower fuel mixture level at which foot 516 substantially closes opening 512 and the upper level at which foot 516 lifts off of opening 512 can be different values.

Operation of gas processor 104 is reflected in the differences between FIGS. 5 and 6. FIG. 5 depicts gas processor 104 with spring 510 compressed and foot 516 in a closed position, mating with upper surface 514 of extension 508 and positioned over opening 512, thereby minimizing the flow of partially outgassed fuel exiting gas processor 104 through fuel outlet 406. The weight of assembly 408 biases spring 510 against foot 516, pushing foot 516 against surface 514. As fuel is introduced into gas processor 104 by way of line 128 through fuel inlet 412, the amount of fuel increases and the surface level (generally indicated at 526) begins to rise within volume 204. As the amount of fuel rises, the fuel begins to lift float assembly 408, gradually removing the weight of assembly 408 from spring 510. Ultimately, as depicted in FIG. 6, the surface level 526 increases to the point where spring 510 becomes substantially uncompressed, and foot 516 lifts clear from opening 512, thereby allowing partially outgassed fuel to leave gas processor 104 via fuel outlet 406. The fuel will continue to flow out of volume 204, lowering float assembly 408 within gas processor 104 until the point at which foot 516 again covers opening 512.

In the embodiment of FIG. 4, gas processor 104 is preferably positioned at a height greater than liquid fuel source 108 so that gravity will aid in feeding the partially outgassed fuel from gas processor 104 in line 116 as it combines with liquid fuel in line 114 from liquid fuel source 108. Also, positioning gas processor 104 above liquid fuel source 108, tends to prevent volume 204 from filling up with fuel.

Further Pressure Management

Figure 7:
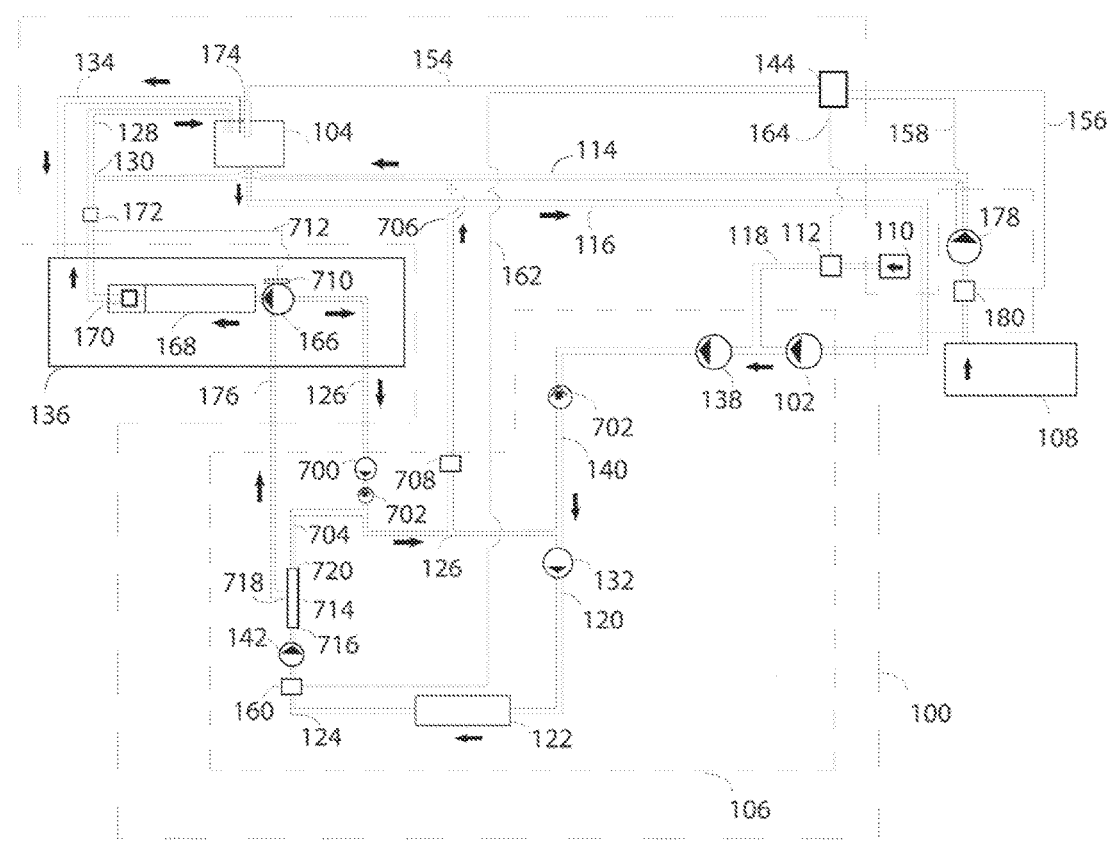
FIG. 7 is a simplified schematic drawing of a homogenizing fuel enhancement system utilizing an embodiment of a gas processor and incorporating further pressure management provisions.
Figure 7:
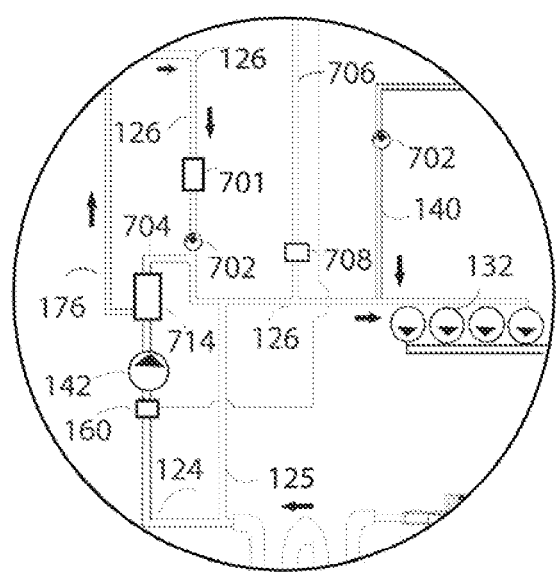
Figure 8:
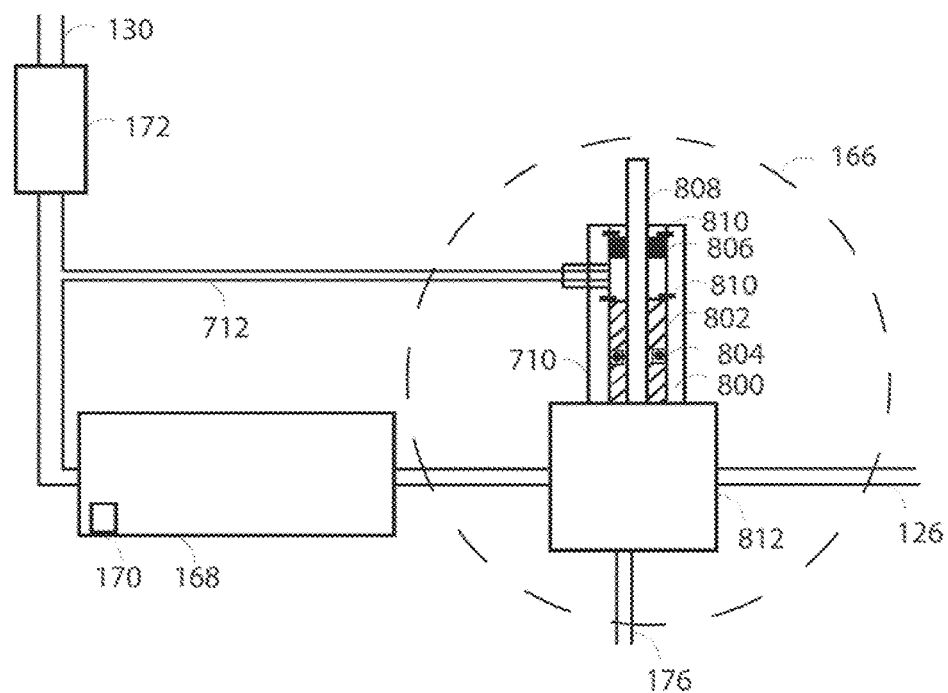
FIG. 8 is a simplified sectional view of a capillary bleed device.

Referring now to FIGS. 7 and 8 sustained exposure to the relatively high pressures generated in system 100 can have a deleterious effect on various engine components. For example, injection pump 166 includes seals that tend to fail if subjected to prolonged exposure to high pressures. When engine 136 is shut off after homogenization system 106 has been operating, in the absence of other provisions, injection pump 166 (and, in particular, its seals) is subjected to the relatively high pressure fuel mixture presented by homogenization system 106 (e.g., pump 142) until such time as the pressure bleeds out of the system. As previously noted, a capillary bleed device can be incorporated into injection pump 166 to protect the seals by bleeding off the pressure, i.e., bleeding off the pressurized fuel being applied to pump 166 by system 106. In addition, in those applications where injection pump 166 is sensitive to high back pressure, a repressurization pump 700 may be interposed in line 126. In those applications where it is desirable to increase the inlet pressure to injection pump 166 a pressure regulator (701, shown in FIG. 7A) may be interposed in line 126 to adjust (e.g., increase) the inlet pressure to pump 166.

Pump 166, in general, includes a body 812, and a pump drive shaft 808 extending out from pump body 812, and having an associated seal 806. Body 812 suitably houses the operative elements of pump 166, e.g., a piston cooperating with an eccentric lobe connected to a shaft 808. Capillary bleed device 710 is configured about the pump shaft 808 adjacent the pump body 812 as having an outer tubular wall 800 bolted or otherwise affixed to the pump body 812 so as to be substantially concentric with the pump shaft 808 and then having a bushing 802 (suitably bronze) slid therein either as a press fit or a virtually net fit engagement over the shaft 808 (e.g., 0.0005" clearance). The bronze bushing 802 further has a few thousandths clearance (e.g., less than 0.010" clearance) with the inside surface of the tubular wall 800 and is sealed therebetween using an o-ring 804, which also serves to allow the bushing 802 to center and/or align on the pump shaft 808 with relatively little to no side load, thereby adding a degree of flexibility to the pump and motor mounts affecting the spatial position and rotation of the pump shaft 808. Opposite the bronze bushing 802 in spacedapart relationship is the pump shaft seal 806 moved from a location along the shaft 808 within the pump housing 812, the space between the bushing 802 and the shaft seal 806 allowing for collection and bleeding off via capillary bleed line 712 of any fuel that has seeped along the pump shaft 808 between it and the bushing 802. In the exemplary embodiment, both the bronze bushing 802 and the outer shaft seal 806 are retained on the pump shaft 808 by retaining rings 810 seated within the inside surface of the outer tubular wall 800. It will be appreciated that with such a capillary bleed device 710 about the pump shaft 808 outside of or exterior to the pump housing 812, and the pump's internal shaft seal outside the housing 812 beyond the bushing 802 sealing the shaft 808, a further fail-safe for the pump's operation is thereby provided, such that even if the pump is working on fuel at on the order of 200 psi to start with or greater, with a pressure differential on the back side of the pump shaft seal, or now the bronze bushing 802, dropping to on the order of 60-100 psi, any such fuel that on that basis overcomes and seeps by the bronze bushing 802 is ultimately returned to the fuel system with the pump continuing to operate as needed. Moreover, it will be further appreciated that the aspect ratio of the bronze bushing 802, or the length of the pump shaft 808 over which the bushing 802 extends, further contributes to the sealing and slow bleed effect of the bleed device 710 beneficial to the pump and its operation.

It is desirable to minimize the flow of fuel escaping pump 166 through bleed line 712. Accordingly, it is desirable to establish a predetermined back pressure on line 712 to slow the down the blow-by past bushing 802. That back pressure can be established by placing a pressure regulator in bleed line 712, or, as is depicted in FIG. 7, connecting bleed line 712 into line 128 upstream of pressure regulator 172.

Even with a back pressure established in bleed line 712, in the absence of other provisions, when engine 136 is shut down, homogenization system 106 will ultimately depressurize (to the value of the back pressure established in line 712, or, if, e.g., regulator 172 is not hermetic, to atmosphere). Depressurization of homogenization system 106 is disadvantageous; it typically results in the undesirable loss of gaseous component infused in the pressurized homogeneous fuel mixture within system 106. Uncontrolled release of gaseous component sometimes creates safety hazards, for example, if the gaseous component is combustible and a pocket of released gaseous component accumulates. Recirculating the unused homogenous fuel into homogenization system 106, and directing the released gaseous component into the air intake of engine 136, tends to minimize the potential for such a hazard during operation. And, provisions can be made to significantly slow depressurization after the system is shut down and minimize the possibility of uncontrolled release of gas.

With reference now to FIG. 7: a lockout valve 714 is interposed in line 176 between pump 142 and injection pump 166; and respective conventional check valves 702 are disposed in line 126 between the bypass output of pump 166 downstream of the junction of lines 704 and 126, and in line 140. In view of the direction of fuel flow during operation (i.e., from pump 142 to pump 166), if a conventional check that accommodated that fuel flow was interposed between pumps 142 and 166, when engine 136 and system 100 are turned off, the pressure in system 106 would hold such a conventional check valve open rather than closed. Given the direction of fuel flow in lines 126 and 140, this is not the case with respect to check valves 702. Accordingly, a valve capable of isolating pump 166 from pump 142 (and in cooperation with check valves 702, homogenization system 106), notwithstanding the resident pressure in system 106 is employed. Lockout valve 714 may be any device capable of performing such function such as, e.g., a suitable solenoid operated valve selectively actuated (or deactivated), under, e.g., microprocessor control, to provide isolation in accordance with the operational state of pump 142. Alternatively, as shown in FIG. 7, a pressure differential valve with an equalization line 704 connected to line 126 may be employed as lockout valve 714.

Lockout valve 714 and check valves 702 selectively isolate infusion volume 122 of homogenization system 106 when system 100 (and engine 136) is not running. Ideally, isolating infusion volume 122 of homogenization system 106 prevents the escape of gaseous component and depressurization. In practice, however, the gaseous component does gradually escape, and if the system remains idle for an extended period of time (typically days or weeks, depending upon, e.g., the particular gaseous component connectors and materials used for the respective fuel lines), the system will ultimately depressurize. However, the gradual release of gaseous component over the extended time period presents little danger of pocket formation.

In some circumstances it may be desirable to re-pressurize the system 106 prior to actuating motor 136. In the absence of re-pressurization, the gaseous component-depleted fuel resident in system 106 would be applied to engine 136 until the system re-pressurized, i.e., new homogenized fuel mixture is created and works its way through system 106 to pump 166.

However, pre-engine ignition re-pressurization can be accomplished by electrically connecting the various electrical components of system 100 to be actuated separately from engine 136 (in addition to being actuated with engine 136), much in the way that glow plugs employed in some diesel engines are energized by a switch separate from the engine ignition, or an accessory setting on an ignition switch. Controller 144 would be programmed to responsively initiate operation of system 100 and continue operation of system 100 for a period of time or until a predetermined condition is met, e.g., until a signal was received from sensor 160, or the admission of engine 136 initiated.

If desired, controller 144 can periodically cause system 106 to be re-pressurized during extended idle periods. For example, upon shut-down of engine 136, controller 144 (maintained under power) can initiate an "idle" count, which is reset upon powering-up of system 100. If the "idle" count is not reset prior to reaching a predetermined value, controller 144 would responsively initiate operation of system 100 and continue operation of system 100 for a period of time or until the predetermined condition is met.

Provisions can also be made to accommodate changes in pressure in the system caused by changes in ambient temperature. For example, increased ambient temperature can cause the fuel mixture, particularly fuel mixtures with low gaseous content, to expand, causing system pressures to increase beyond normal levels. Such pressure differentials can be accommodated by an accumulator, such as described in U.S. Pat. No. 7,861,696, issued Jan. 4, 2011 to the present inventor and commonly owned herewith. Alternatively, referring to FIG. 7, a line 706 including a pressure regulator 708 communicating between homogenization system 106 (upstream of circulation pump 132) and gas processor 104 (e.g., via lines 114 and 128) provides a release in the event that pressure exceeds a predetermined level, e.g., 100 psi.

Figure 9:
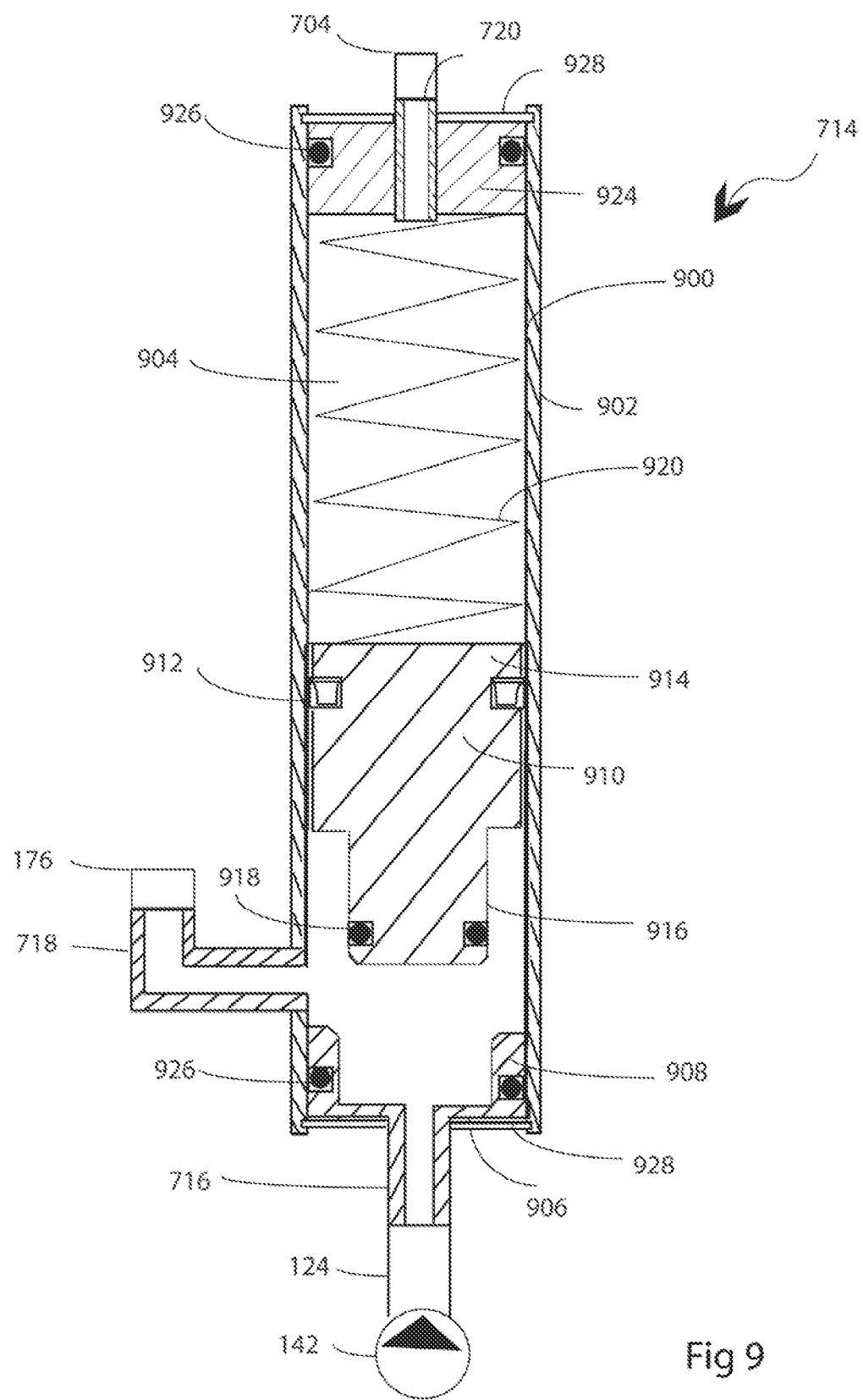
FIG. 9 is a cross-sectional representation of a pressure differential check valve suitable for use in the system of FIG. 7, with a plunger in the open position.
Figure 10:
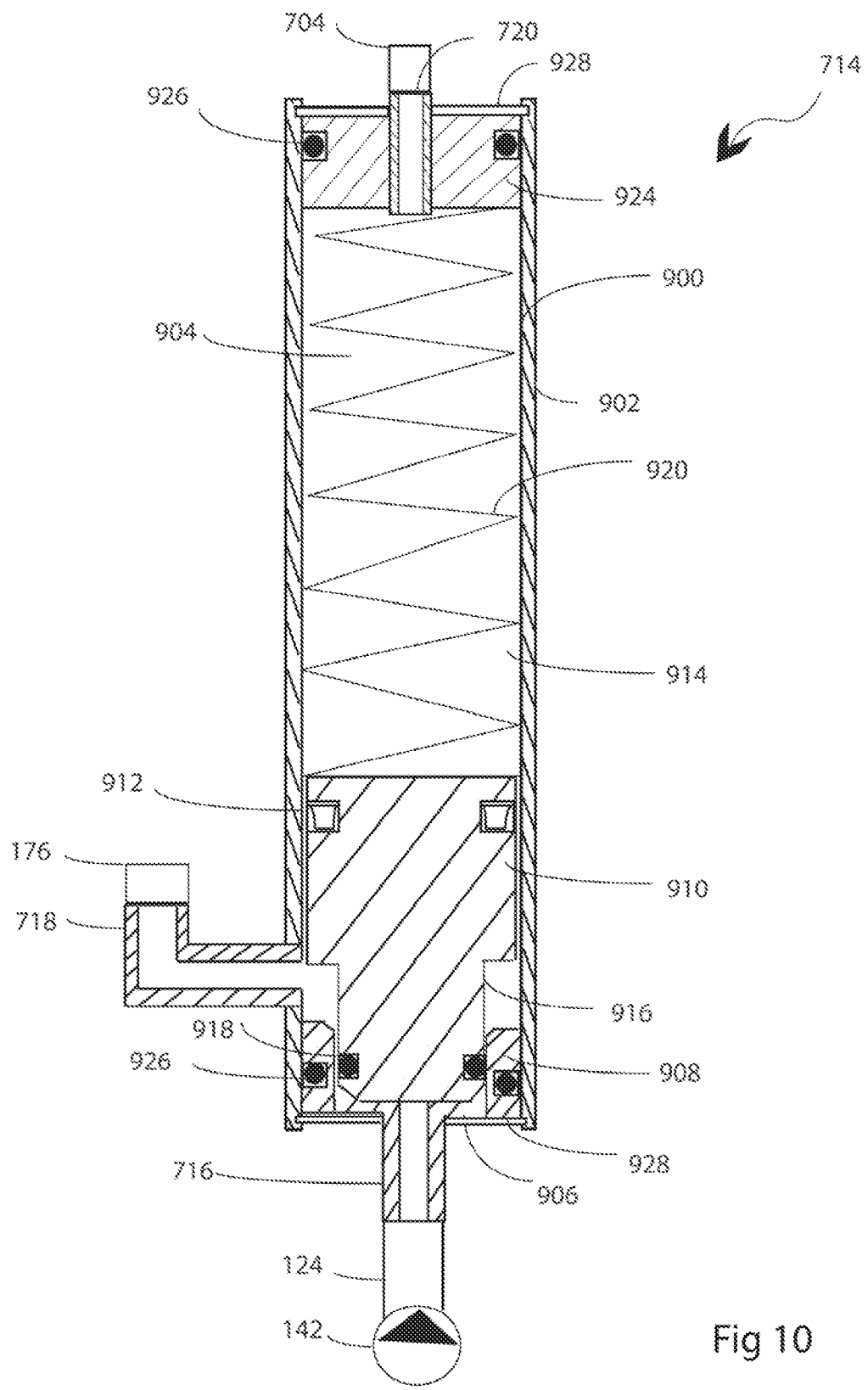
FIG. 10 is a cross-sectional representation of the pressure differential check valve of FIG. 9, with the plunger in the closed position.

Referring to FIGS. 7, 9 and 10, a suitable pressure differential valve 714 comprises: a body 900 defining an interior cavity 904; a fuel inlet 716; a fuel outlet 718; an equalization port 720; a receptacle (seat) 908; a plunger 910; upper and lower sealing mechanisms, 912 and 918 respectively and a bias spring 920. The upper sealing mechanism 912 suitably comprises e.g. Teflon seal, and lower sealing mechanism 918 suitably comprises an O-ring.

Fuel inlet 716, fuel outlet 718, and equalization port 720 suitably provide fluid communication between with interior cavity 904 and pump 142 (through line 124), injection pump 166 (through line 256) and line 126 downstream of check valve 702 (through equalization line 704), respectively. Plunger 910 is suitably slidably disposed within cavity 904, cooperating with the upper sealing mechanism (e.g., Teflon seal 912) to isolate fuel outlet 718 from equalization port 720 and to move between open and closed positions (depicted in FIGS. 9 and 10, respectively) in accordance with the operation of pump 142. Spring 920 is arranged to bias plunger 910 toward the closed position. In the closed position (FIG. 10), plunger 910 is seated in receptacle 908 closing off fuel inlet 716, with the upper sealing mechanism (e.g., Teflon seal 912) isolating fuel outlet 718 from equalization port 720. In the open position (FIG. 9) plunger 910 is disposed out of sealing relationship with receptacle 908 such that fuel flows into cavity 904 and out of fuel outlet 718 through line 176 to pump 166. The upper sealing mechanism suitably continues to isolate equalization port 720.

In general, when pump 142 is operating, pressurized homogenized fuel flows through fuel inlet 716 under sufficient pressure to overcome the bias of spring 920 (and push any fuel in cavity 904 above plunger 910 out through equalization port 720) and move plunger 910 into the open position. When pump 142 is not operating (i.e., engine 136/system 100 is not running): the pressures in lines 176 and 126 equalize at the level of homogenization system 106 and fuel flows into cavity 904 through equalization port 720; and the combination of pressure from spring 920 and the pressure from the fuel entering cavity 904 through equalization port 720 biases plunger 910 downward to seat in receptacle 908 creating (with the lower sealing mechanism 918) essentially hermetic pressure seal in line 124.

Body 900 can be made of any material, e.g., metal or plastic, that is compatible with the liquid fuels (e.g., petrochemicals) and the gaseous component contemplated herein, and can be of any configuration that provides a suitable interior volume, inputs and outputs, and can be mounted in the space available. In the embodiment of FIGS. 7, 9 and 10, body 900 comprises a hollow cylindrical tube 902 of predetermined diameter (suitably in the range of, e.g., from 0.5 to 2 inches, and in this particular example 1 inch) and length (suitably in the range of, e.g., from 2 to 6 inches, and in this particular example 4 inches), cooperating with bottom and top end caps 906 and 924. End caps 906 and 924 are suitably sealed against outer tube 902 by respective o-rings 926, and secured with retaining rings 928.

Fuel inlet 716 and receptacle 908 are suitably located in bottom end cap 906. Bottom end cap 906 suitably comprises a cylindrical body having an outer diameter approximating the inner diameter of tube 902. Receptacle 908 is suitably a recess of predetermined depth and peripheral configuration (preferably cylindrical of predetermined diameter) opening into cavity 904, coaxially disposed in bottom end cap 906. Fuel inlet 716 suitably opens into the bottom of receptacle 908.

Plunger 910 is suitably formed of a relatively heavy material, such as, e.g., steel, to minimize susceptibility to harmonic vibrations in the liquid fuel caused by pump feedback, and comprises a body including first and second portions 914 and 916. First portion 914 conforms in peripheral shape to cavity 904, e.g., is cylindrical with a predetermined diameter (suitably in the range of, e.g., from approaching 0.5 to approaching 2 inches, and in this particular example 1 inch) approaching that of the cavity, e.g., the interior diameter of tube 902. Second portion 916 has a peripheral configuration corresponding to that of receptacle 908 e.g., is cylindrical with predetermined diameter (suitably about 75% of the major diameter, e.g., from ⅜ to 1.75 inches, and in this particular example 0.75 inch) approaching the interior diameter of cylindrical recess 1208. Second portion 916 is adapted to be sealingly received within receptacle 908

As previously noted, the upper sealing mechanism suitably comprises, e.g., Teflon seal 912 and serves the function of isolating fuel outlet 718 from equalization port 720. When a Teflon seal 912 is utilized it is suitably affixed to the interior wall of tube 900 axially disposed within the travel of the first (major diameter) portion 914 of plunger 910 The peripheral surface of plunger portion 914 that interacts with seal 912 is suitably polished to a mirror surface. A Teflon seal is advantageous as compared to a conventional O-ring in that it exerts much less friction with respect to movement of plunger 910 and thus does not require as strong a bias spring 920.

Specific Example of Homogenizing Fuel Enhancement System

Figure 11:
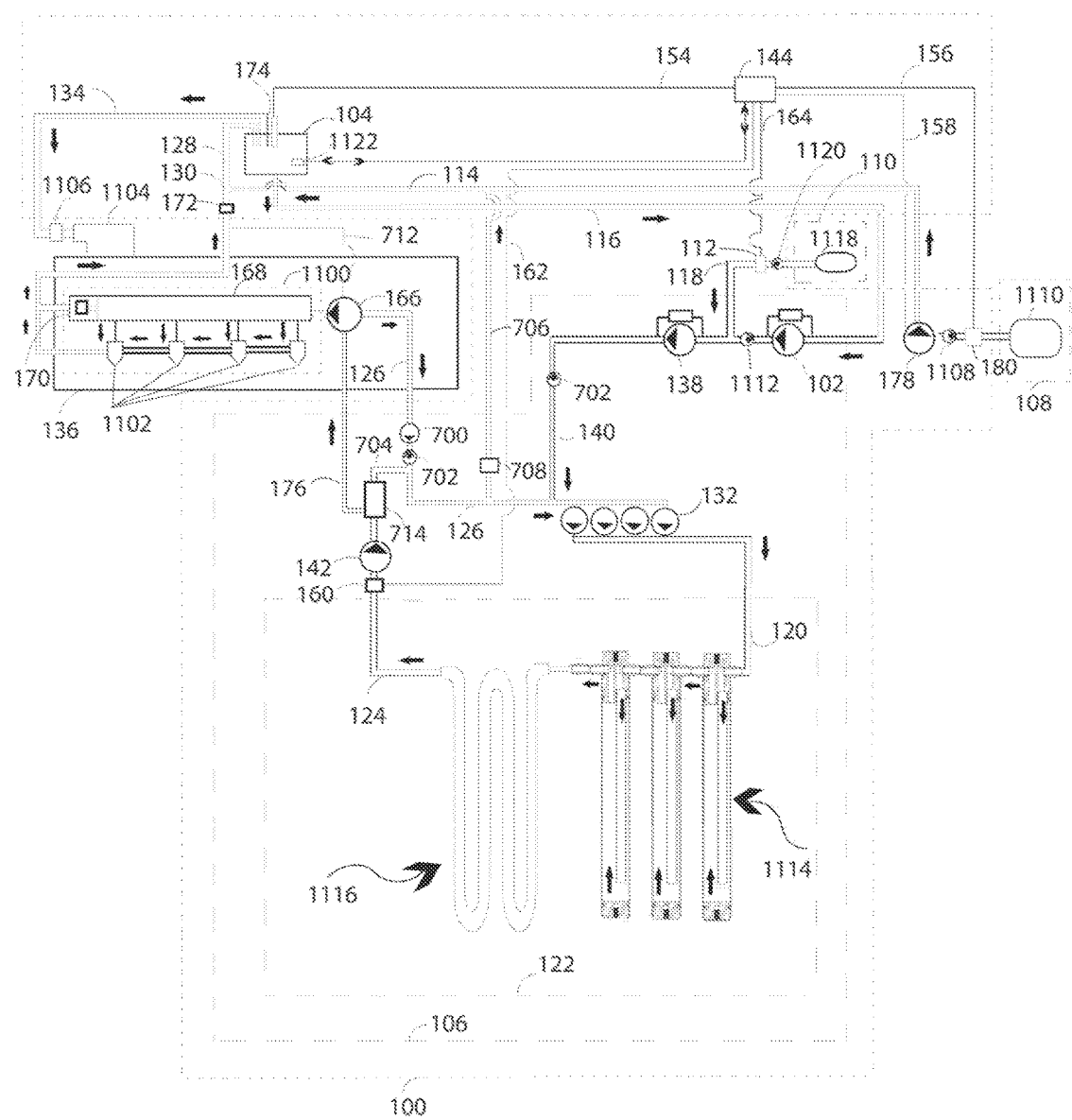
FIG. 11 is a schematic drawing of one particular example of a homogenizing fuel enhancement system of FIG. 1.

Turning now to FIG. 11, a specific non-limiting exemplary embodiment of a homogenizing fuel enhancement system of the type shown in FIG. 7 employing hydrogen as the gaseous component is described in the context of a 2.0 liter common rail diesel engine operating at injection (common rail) pressures on the order of 20,000 psi, such as standard in a 2009 Volkswagen TDI automobile. In this particular embodiment, liquid fuel source 108 comprises a conventional diesel fuel tank 1110. Tank 1110 cooperates with a flow control device (e.g. conventional lift pump) 178, adapted for activation/deactivation in response to signals (158) from controller 144; a flow meter 180 adapted to generate a signal to controller 144 in response to passage of a predetermined volume flow of diesel fuel therethrough from tank 1110 into system 100; and a conventional check valve 1108 disposed to prevent backflow into flow meter 180 and tank 1110. Lift pump 178 controllably supplies diesel fuel to system 100 through line 114 at a pressure of approximately 2 psi. In operation, lift pump 178 is activated/deactivated by control signals (158) from controller 144 to provide liquid fuel to gas processor 104 in accordance with control signal (154) from level detector 174 to maintain the desired level of fuel in gas processor 104.

Gas processor 104, in this particular example, comprises a cylinder approximately 3 inches in diameter and 10 inches in length and employs an anti-slosh tube 232 approximately 1.25 inch in diameter and 6 inches in length.

Gaseous component source 110 comprises a pressurized tank 1118 (initially at 1,800 psi) of hydrogen, regulated down to 120 psi. Tank 1118 cooperates with a conventional check valve 1120 disposed to prevent backflow into tank 1118, and a solenoid valve 112 adapted to open/close in response to control signal (162) from controller 144. Hydrogen gas is supplied to homogenization system 106 through line 118 at a pressure of 120 psi.

Pumps 102, 138, and 142 of homogenization system 106 each comprise conventional roller vane pumps, encapsulated in aluminum housings to facilitate high-pressure operation. Pumps 102 and 138 each incorporate a pressure regulator to maintain output pressures of 60 psi and 80 psi, respectively. A check valve 1112 is disposed at the output of pump 102 to prevent any backflow into that pump.

Pump 132 comprises four parallel mounted roller vane pumps, again encapsulated in an aluminum housing to facilitate high-pressure operation. By arranging the circulation pumps in parallel, each pump processes a small portion of the overall fuel stream and circulating their portion through homogenization system 106. The arrangement of several smaller displacement pumps that work on a portion of a larger stream minimizes the chance of cavitation that might occur in a single pump having a displacement equal to the combined displacement of the several smaller pumps. Pump 132 increases the pressure in line 120 going into infusion volume 122 to 100 psi.

Homogenization system 106 includes an infusion volume 122 comprising three "reverse-flow" (bi-flow) infusion tubes 1114 and two straight through-flow (uni-flow) infusion tubes 1116, all in series. More details regarding both the bi-flow and uni-flow infusion tubes are found below with respect to FIGS. 12-14. While in infusion volume 122, the fuel mixture is maintained at pressure approaching 100 PSI, but tends to lose some pressure as it traverses the volume; the homogenized fuel mixture exiting infusion volume 122 (e.g., exiting the last successive infusion tube) passing through sensor 160 to pump 142 is at about 90 psi. Infusion volume 122, e.g. infusion tubes 1114 and 1116 is specifically configured to provide varying fluid velocities within homogenization system 106, thereby promoting mixing of the fuel mixture and promoting infusion of the hydrogen into the liquid diesel fuel.

Sensor 160 comprises an opacity sensor, generating a signal to controller 144 indicative of, e.g., the ratio of hydrogen and diesel fuel controller 144 generates control signal (162) to solenoid valve 112 to control the amount of hydrogen injected into system 106; in general, solenoid valve 112 is opened each time a predetermined volume of diesel flows out of tank 1110 as indicated by signal (164), with the duration that it is held open (the amount of hydrogen injected) controlled in accordance with the signal from sensor 160. In particular, in this example, solenoid valve 112 is opened for a predetermined duration corresponding to 70 sccm of hydrogen for every 0.02 gallon of diesel provided to system, but is disabled in response to signal (162) from sensor 160 if the percentage of hydrogen in the fuel mixture exceeds a predetermined level (e.g., 100 sccm of hydrogen/0.02 gal of diesel).

Pump 142 receives the homogenized fuel mixture from infusion volume 122 and increases the pressure to approximately 120 psi. Pump 142 comprises a conventional roller vane pump, encapsulated in an aluminum housing to facilitate high-pressure operation. The portion of the pressurized homogeneous fuel mixture that bypasses pump 166 is fed back to homogenization system 106 through line 126 at 80 psi (the pressure level established by pump 138).

Injection system 168 comprises an injection pump 166, a common rail 1100 and a cooperating set of injectors 1102, all of the type typically utilized with 2009 Volkswagen TDI automobile. Pump 166 is, however, modified to include a capillary bleed 710. Pump 166 provides the homogeneous fuel mixture to common rail 1100 and injectors 1102 at a pressure of 20,000 psi. Upon injection, the fuel mixture will undergo an immediate pressure drop from 20,000 psi to roughly 300 psi within the combustion chamber. This results in a rapid expansion of the hydrogen, and because the highly pressurized fuel mixture is substantially homogeneous, the hydrogen atomizes the diesel, rapidly scattering the diesel throughout the combustion chamber for a substantially uniform and complete combustion. The end result is that more power is extracted from the fuel mixture during each combustion event, thereby causing more efficient operation of the engine.

Unused homogeneous fuel from both common rail 1100 and injectors 1102 is fed via return line 128 to gas processor 104 as described above. Pressure regulator 170 (integral to the common rail) maintains the common rail pressure at its operational level of 20,000 psi, while pressure regulator 172 provides a specific backpressure of 60 psi on injectors 1102 to optimize their operation.

In gas processor 104, the hydrogen infused diesel mixture is brought to atmospheric pressure and retained for a time period sufficient to permit a portion (e.g., the less entrained portion) of the hydrogen to outgas from the mixture. The released hydrogen gas is fed to air intake 1104 of engine 136 via gas return line 134. A flashback suppressor 1106 is employed to ensure that the hydrogen gas does not ignite. (Differential valve 714 and check valves 702 prevent undesired release of hydrogen gas when the system is not in operation). The recirculated unused homogeneous fuel is mixed with unaltered diesel fuel from tank 1110 in gas processor 104 and gravity fed to pump 102 for use in homogenization system 106.

It is contemplated that homogenizing fuel enhancement system 100 may be employed in regions of extreme weather temperatures. For example, the present subject matter could be installed in an automobile, locomotive, marine vessel or stationary power plant etc. located in an extreme cold weather region, such as Alaska or northern Europe where temperatures during winter can approach −40° F. In such temperatures, diesel (and other liquid fuels) retained, e.g., overnight, in gas processor 104 would tend to gel. In such cases a heating element 1122 can be included, mounted in the lower half of gas processor 104 (below the anticipated surface level of the fuel mixture within volume 204). This heating element is configured to heat the fuel in gas processor 104 to keep the liquid fuel from gelling. Heating probe 1122 would suitably be actuated pursuant to signals from controller 144 in accordance with a predetermined parameter, e.g., engine temperature. Preferably, a combination heating element/temperature probe is utilized, which suitably provides indicia of temperature to controller 144.

Exemplary Embodiments of Infusion Tubes

As previously noted, the particular embodiments of homogenization system 106 shown in FIGS. 1, 4, 7 and 11 employ an infusion volume 122 to homogenize the liquid-gas fuel. The fuel mixture entering infusion volume 122 is relatively non-homogenous, with relatively large bubbles of gas non-uniformly distributed within the liquid. (This is particularly true when the gas is introduced in pulses or bursts after a corresponding predetermined volume of liquid have been introduced to the system.) The traversal through infusion volume 122 at least at a predetermined velocity (e.g., in the range of 1 to 3 gallons per minute) breaks up and evenly distributes the gaseous component within the mixture in relatively small, relatively uniformly sized, bubbles. The process of breaking up and distributing the gaseous component is accomplished within infusion volume 122 by maintaining relatively high pressure and using various mechanisms, such as, for example, one or more of: friction and turbulence caused by impact with structures (e.g., sidewalls, end walls and connectors) of the body defining infusion volume 122 as the fuel mixture flows through the volume; and changes (contractions and expansions) in the volume through which the mixture flows. The pressurized fuel mixture is retained within infusion volume 122 long enough for these mechanisms to render the mixture essentially homogenous. The infusion volume 122 can be implemented, e.g., using one or more infusion tubes connected in series. The infusion tubes can be of varying configurations and sizes, e.g., flow-through (uni-flow), or "reverse-flow" (bi-flow), straight, curved serpentine or such other shapes as necessary to provide the requisite infusion. The tubes may be disposed and distributed to fit in the particular application.

Figure 12:
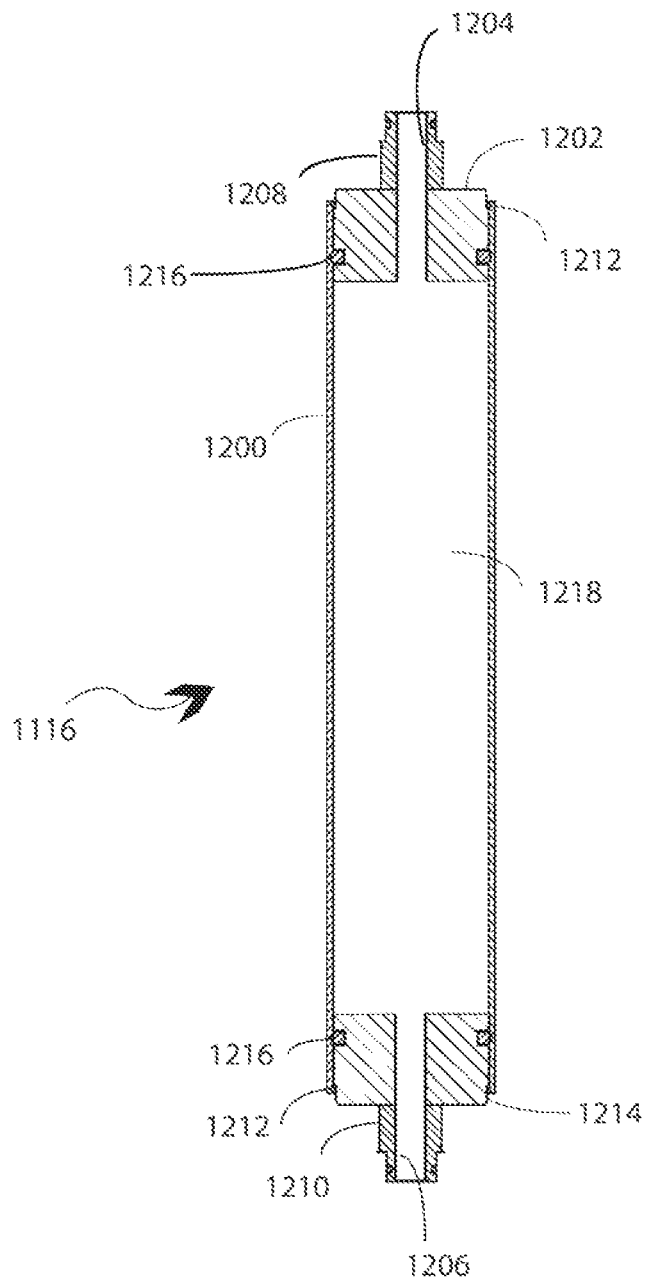
FIG. 12 is a cross-sectional representation of a uni-flow infusion tube.

Referring to FIG. 12 a uni-flow infusion tube 1116, (shown as straight in FIG. 12, but which could be curved or serpentine such as shown in FIG. 11) suitably comprises a body, (preferably a tube 1200 of predetermined length and diameter, closed with respective end walls 1202 and 1214), defining an interior volume 1218, with respective passages 1204 and 474, (preferably through end walls 1202 and 1214) providing fluid communication with the interior volume. If desired, respective connectors 1208 and 1210, associated with passages 1204 and 1206, respectively can be provided. End walls 1202 and 1214 are suitably secured in place within the tube wall 1200, e.g., using a slip fit and o-ring 1216 seal with a mechanical retaining ring 1212. The components of the infusion tube 1116 can be formed from any suitable material now known or later developed, though it is presently contemplated that they will primarily be made of aluminum.

The fuel mixture is received at one end of the infusion tube 1116 through first passage 1204 (e.g., in end wall 1202), flows through volume 1218 and out through passage 1206 (e.g., in end wall 1214).

In the embodiment of FIG. 12, infusion tube volume 1218 is essentially defined by the inside length and inside diameter of the tube wall 1200; that is, the volume is bounded by the tube wall 1200 and the first and second end walls 1202, 1214. The diameter typically ranges from 0.75 inch to 2.5 inches. The length-to-diameter ratio of the exemplary infusion tube suitably ranges from 10:1 to about 100:1. In this particular example the length-to-diameter ratio is about 5:1. That is, the tube has a nominal outside diameter of two inches (2") and nominal inside diameter of one and seven eighths inch (1⅞") and an overall length of approximately forty-two inches (42"). This configuration allows for the space within the infusion tube 1116 to provide a volumetric expansion region for the fuel mixture; assuming a one inch (1") thickness of each end wall 1202, 1214, the total infusion volume 1218 within each alternative through-flow infusion tube 1116 is one hundred eleven cubic inches (111 in$^3$) (Volume=Length×Area=40 in.×($\pi$×(0.94 in.)$^2$)).

Assuming a nominal half inch (½") internal diameter (I.D) or larger inlet and outlet size through the respective passages 1204, 1206, the fuel mixture exiting passage 1204 into infusion volume 1218, specifically, goes through an expansion from a roughly half inch (½") fuel line to a roughly two inch (2") I.D. infusion tube 1116. This configuration is advantageous in that it is of particularly simple construction and not orientation-dependent.

Figures 13, 14:
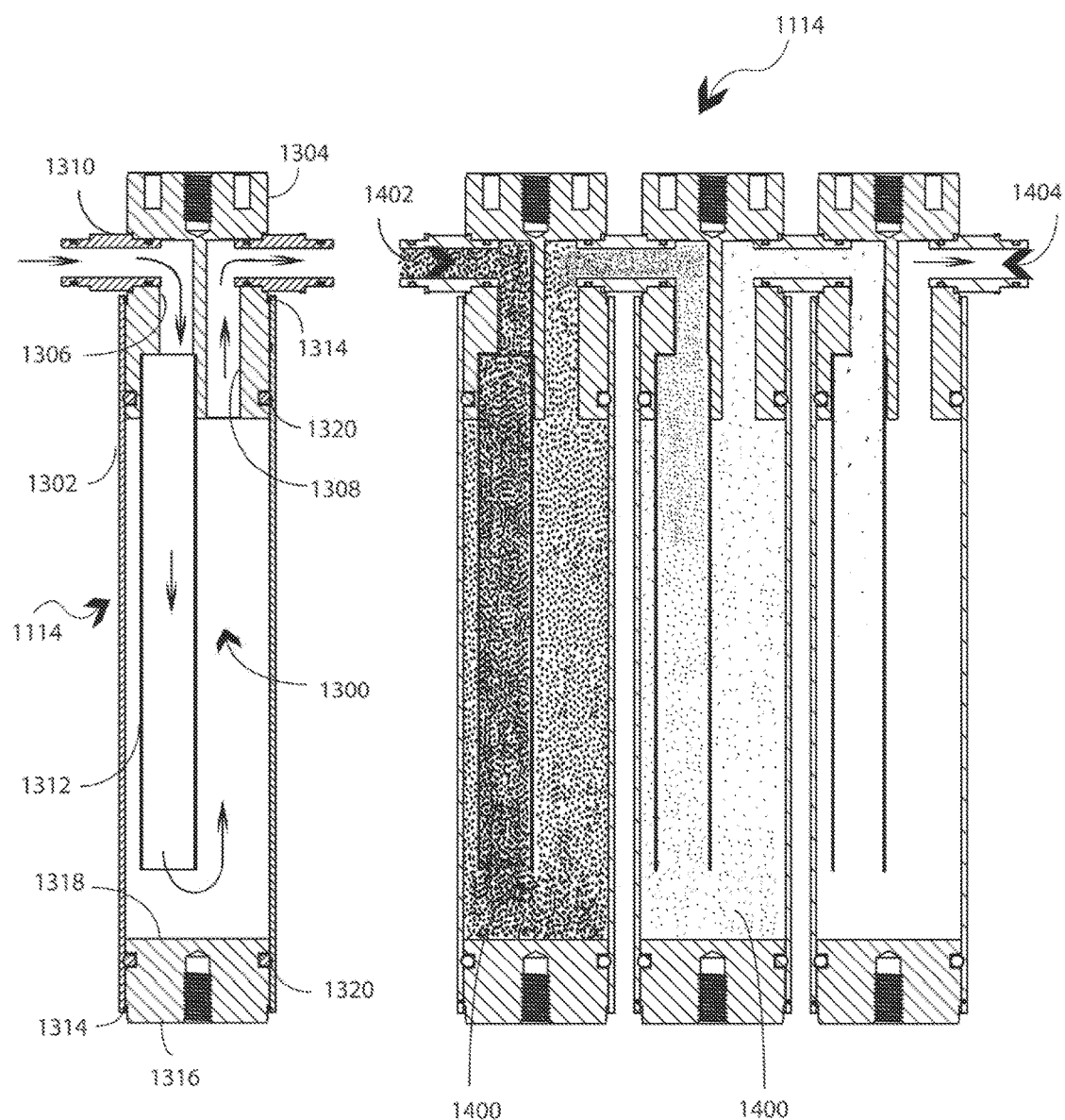
FIG. 13 is a cross-sectional representation of a bi-flow infusion tube.
FIG. 14 is a cross-sectional representation of three bi-flow infusion tubes of FIG. 13 arranged in series.

Turning now to FIG. 13, there is shown a single reverse-flow infusion tube 1114. Reverse-flow infusion tube 1114 suitably comprises a body defining an internal volume 1300, with an inlet passage 1306 and outlet passage 1308, and an inlet tube 1312 of predetermined length and diameter communicating with inlet passage 1306 and extending a predetermined distance into interior volume 1300. The body preferably comprises tube 1302 of predetermined length and diameter, closed with respective end walls 1304 and 1316. End cap 1316 suitably has an interior surface 1318 disposed facing the exit of inlet tube 1312. While depicted in FIG. 13 as flat, if desired, surface 1318 can be specifically configured or "roughened" to create turbulence in the fuel mixture flow. End walls 1304 and 1316 are suitably secured in place within the respective opposite ends of the tube wall 1302 employing o-rings 1320 and retaining rings 1314, though again any other such configuration and assembly technique now known or later developed may be employed.

The fuel mixture enters infusion tube 1114 through inlet passage 1306 (preferably formed in end cap 1304) and through inlet 1312, exiting the inlet 1312 generally adjacent the second end cap 1316. The fuel mixture exiting inlet 1312 tends to come into impact with a surface 1318 of end wall and, in any event, passes through internal volume 1300 to exit through passage 1308 (suitably formed in the first end cap 1304) and thus pass on to further infusion tubes or the other parts of the system.

The reverse flow infusion tube 1114 design shown in FIGS. 13 and 14 uses velocity and surface friction effect or "rub" to work in breaking apart the gas bubbles (generally denoted 1400 in FIG. 14) as the multi-fuel mixture flows through the tubes 1114. In addition, the flow out of inlet tube 1312 tends to impact the inner surface 1318 of second end cap 1316 of the infusion tube 1114, which further encourages bubble collapse and homogeneity of the liquid-gaseous fuel mixture. Thus, infusion tubes need not be disposed in any particular orientation. It is not necessary that the flow of the fuel enter the main tube volume downwardly so that the bubbles attempt to rise against this down-flow; however, gravitational effects of the downward flow render a more vertical orientation of the tube helpful with the infusion.

If desired, multiple infusion tubes can be integrated into a single unit. Referring to FIG. 14, three such "reverse-flow" infusion tubes 1114 are combined in series via connectors 1310 interconnecting respective inlets and outlets, or first and second flow passages 1306, 1308, respectively. The configuration of the infusion tubes 1114 with horizontally oriented inlet and outlet passages 1306, 1308 and the use of the universal connector 1310 makes connecting the infusion tubes 1114 or setting them up in series quite simple and space efficient without the added cost, complexity, and potential failure modes of multiple hoses and connectors or clamps, etc.

The pressurized liquid-gaseous fuel mixture entering infusion volume 122 (from pump 132) is relatively non-homogenous, with relatively large bubbles of gas non-uniformly distributed within the liquid. This is schematically illustrated in FIG. 14, generally indicated as 1402. With a flow pattern such as provided by serially connected reverse flow infusion tubes 1114, the bubbles flow at relatively high velocity forward through successive infusion tubes 1114 in series, such that each successive contraction (passing through inlet passage 1306 of the next successive infusion tube) and expansion (flowing into inlet tube 1312, and then the remainder of the interior volume), and interaction with the physical structures during travel further breaks up and distributes the gas bubbles. Ultimately, by the time the fuel mixture exits the last infusion tube in the series, as generally indicated in FIG. 14 as 1404, any gas bubbles are micro-sized, virtually imperceptible to the naked eye, and substantially uniformly distributed throughout the mixture.

Although various exemplary embodiments have been described herein, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

What is claimed is:

1. A fuel enhancement system, adapted to cooperate with an engine, a source of liquid fuel, and a source of gaseous component, for supplying the engine with a pressurized homogenized fuel mixture comprising a mixture of the liquid fuel and the gaseous component, the engine including at least one back-pressure sensitive component, where, in operation, at least part of the fuel mixture supplied to, but unused by, the engine is returned to the fuel enhancement system from at least one back-pressure sensitive engine component, the fuel enhancement system comprising: a controller, a gaseous component flow control device, a homogenization system, and a gas processor;

the gaseous component flow control device being adapted to cooperate with the source of the gaseous component and, responsive to control signals applied thereto, controllably provide gaseous component to the homogenization system;

the homogenization system having a first portion, operating at a first pressure, receptive of liquid fuel and unused fuel mixture from the back-pressure sensitive component, at least the unused fuel mixture being provided through the gas processor;

the controller being receptive of indicia of at least one predetermined operating parameter of the homogenization system, and adapted to provide control signals to the gaseous component flow control device to control the ratio of gaseous component to liquid fuel;

the homogenization system being adapted to mix the liquid fuel and gaseous component, and provide a fuel mixture to the engine at a second pressure having bubbles of the gaseous component distributed throughout the mixture;

the gas processor being operatively disposed between the back-pressure sensitive component and the homogenization system first portion, receiving unused fuel mixture from the back-pressure sensitive component, and adapted to bring the fuel mixture to a predetermined gas processor pressure no greater than the particular back-pressure level before providing the fuel mixture to the homogenization system first portion.

2. The system of claim 1 wherein the gas processor is further adapted to condition the fuel mixture to make it suitable for introduction to the first portion of the homogenization system.

3. The system of claim 1 wherein the gas processor pressure is approximately equal to atmosphere.

4. The system of claim 2 wherein the homogenization system first portion includes at least one component sensitive to levels of gaseous component in the fuel mixture, and the gas processor is adapted to condition the fuel mixture by outgassing at least a portion of the gaseous component from the fuel mixture before introduction to first portion of the homogenization system.

5. The system of claim 4 wherein the component sensitive to levels of gaseous component in the fuel mixture is a pump.

6. The system of claim 4 wherein the gas processor outgasses at least a portion of the gaseous component from the fuel mixture by retaining the fuel mixture at the gas processor pressure for at least a minimum period of time.

7. The system of claim 1 wherein the homogenization system first portion includes: first and second pumps; the first pump being receptive of primarily liquid fuel comprising liquid fuel and unused fuel mixture from the back-pressure sensitive component, at least the unused fuel mixture being provided through the gas processor, for increasing the pressure of the substantially liquid fuel to a first low pressure level; the second pump being receptive of the output of the first pump and gaseous component provided by the flow control device, increasing the pressure of the fuel mixture passing therethrough to a second pressure level, the second pressure level being higher than the first low pressure level.

8. The system of claim 7 wherein the homogenization system includes a second portion including: a circulation pump receptive of the output of the first portion second pump, and fuel mixture supplied to, but unused by, the engine, returned to the fuel enhancement system from other than back-pressure sensitive components, for raising the fuel mixture passing therethrough to an intermediate pressure higher than the second pressure level; and an infusion volume receptive of the output of the circulation pump.

9. The system of claim 8 wherein the homogenization system second portion further includes a bypass line communicating between the output of the infusion volume and the input of the circulation pump.

10. The system of claim 8 wherein the homogenization system includes a third portion including: a pressurizing pump receptive of the output of the infusion volume, raising the fuel mixture passing therethrough to the second pressure for application to the engine.

11. The system of claim 1 wherein the controller is receptive of indicia of flow of liquid fuel and generates control signals to the gaseous component flow control device in accordance therewith.

12. The system of claim 11 wherein the controller generates control signals to the gaseous component flow control device to introduce a predetermined amount of gaseous component into the homogenization system in response to the introduction of a predetermined amount of liquid fuel into the homogenization system.

13. The system of claim 12 wherein the controller generates control signals to the gaseous component flow control device to introduce approximately 70 sccm of gaseous component into the homogenization system in response to the introduction of approximately 0.02 gallon of liquid fuel into the homogenization system.

14. The system of claim 13 wherein the gaseous component is hydrogen and the liquid fuel is diesel.

15. The system of claim 1 wherein the bubbles of the gaseous component are micro-bubbles.

16. The system of claim 1 wherein the gas processor is adapted to retain the fuel mixture at the gas processor pressure for at least a period of time sufficient to permit outgassing of the gaseous component from the fuel mixture to an extent that the fuel mixture is made suitable for introduction to the homogenization system first portion.

17. The system of claim 1 wherein the gas processor comprises:
a body defining an interior volume;
a fuel inlet, communicating with the interior volume, adapted to receive the unused fuel mixture from the back-pressure sensitive components;
a gas outlet, communicating with the interior volume, providing an exit from the interior volume for gaseous component outgassed from the unused fuel mixture within the interior volume and establishing the gas processor pressure; and a fuel outlet, communicating with the interior volume, adapted to supply the fuel mixture exiting the interior volume to the homogenization system;

the gas processor being configured to retain the fuel mixture within the interior volume at the gas processor pressure for at least the minimum period of time.

18. The system of claim 17 wherein the gas processor is adapted to retain the fuel mixture within the interior volume at the gas processor pressure for at least a period of time sufficient to permit outgassing of the gaseous component from the fuel mixture to an extent that the fuel mixture is made suitable for introduction to the homogenization system first portion.

19. The system of claim 17 wherein the engine includes an air intake and the gas processor gas outlet is adapted to be connected to the air intake.

20. The system of claim 17 wherein the gas processor is adapted to receive liquid fuel from the liquid fuel source and further comprises a fuel level detector disposed within the interior volume, the fuel level detector generating indicia of the fluid level in the internal volume to the controller.

21. The system of claim 20 wherein:
the fuel enhancement system further comprises a liquid fuel flow control device, responsive to control signals applied thereto, cooperating with the source of liquid fuel; and
the fuel level detector generates a signal to the controller indicative of the fluid level in the internal volume dropping below a predetermined level;
the controller, responsive to the signal from the fuel level detector, generating signals to the gaseous component flow control device to cause the addition of a predetermined amount of gaseous component to the homogenization system and to the liquid fuel flow control device, to cause the addition of a predetermined amount of liquid fuel to the gas processor.

22. The system of claim 21 wherein:
the controller comprises first and second timers,
the first timer being actuated in response to the signal from the fuel level detector and generating a control signal of a first predetermined duration to the liquid fuel flow control device, to cause the addition of a predetermined amount of liquid fuel to the gas processor;
the second timer being actuated in response to the signal from the fuel level detector and generating a control signal of a second predetermined duration to the gaseous component flow control device, to cause the addition of a predetermined amount of gaseous component to the homogenization system.

23. The system of claim 21 wherein:
the homogenization system further includes a sensor for generating indicia of a specified characteristic of the fuel mixture from the infusion volume is outside of predetermined limits
the controller further comprises a switch, responsive to the indicia of the characteristic being outside of limits, for inhibiting operation of the second timer during such periods that the specified characteristic of the fuel mixture is outside of limits.

24. The system of claim 21 wherein: the controller comprises a microcontroller.

25. The system of claim 17 wherein:
the fuel enhancement system further comprises a liquid fuel flow sensor, cooperating with the source of liquid fuel, generating signals indicative of the volume of liquid fuel provided by the source of liquid fuel; and
the signals indicative of the volume of liquid fuel being provided to the controller as indicia of a predetermined operating parameter of the homogenization system.

26. The system of claim 25 wherein the controller comprises:
a counter, responsive to the signals from the liquid fuel flow sensor, adapted to generate an output signal when it reaches a count corresponding to a predetermined volume of liquid fuel;
and a timer adapted to generate, responsive to the output of the counter, a pulse of predetermined duration provided as a control signal to the gaseous component flow control device.

27. The system of claim 17 wherein:
the gas processor further comprises a float, disposed within the interior volume to move therein in accordance with the level of fluid in the interior volume,
the float being adapted to substantially close off the gas processor fuel outlet when the level of fluid in the interior volume falls below a predetermined minimum desired level, and to move off of and clear the gas processor fuel outlet to permit flow of the fuel mixture out of the gas processor when the level of fuel in the interior volume exceeds a predetermined upper level.

28. The system of claim 17 wherein the gas processor pressure is equal to atmosphere.

29. The system of claim 1 wherein:
the homogenization system first portion is adapted to receive the gaseous component and to produce a liquid-gaseous fuel mixture; and
the homogenization system further comprises a circulation path, having at least one pump cooperating therewith, receiving the liquid-gaseous fuel mixture, and including an infusion volume through which the liquid-gaseous mixture must traverse at least a predetermined pressure before being provided to the engine.

30. The system of claim 29 wherein, in operation, at least part of the fuel mixture supplied to, but unused by, the engine is returned to the fuel enhancement system from other than back-pressure sensitive components, that part of the returned fuel mixture being introduced into the circulation path.

31. The system of claim 29 wherein the homogenization system further comprises means for avoiding depressurization of the circulation path upon shutdown of the engine.

32. The system of claim 31 wherein the means for avoiding depressurization comprises respective valves, adapted to close upon shutdown of the engine.

33. The system of claim 1 wherein the homogenization system first portion is adapted to receive the gaseous component, and produce a liquid-gaseous fuel mixture; and the homogenization system further comprises:
a circulation pump receptive of the liquid-gaseous fuel mixture from the first portion;
an infusion volume,
the circulation pump directing the liquid gaseous fuel mixture through the infusion volume at a predetermined pressure, the infusion volume being configured such that liquid gaseous fuel mixture exiting the infusion volume after traversal has bubbles of the gaseous component distributed uniformly throughout the mixture; and a pressurization pump disposed between the infusion volume and the engine, for increasing the pressure of the fuel mixture applied to the engine to the second pressure.

34. The system of claim 33 wherein, in operation, at least part of the fuel mixture supplied to, but unused by, the engine is returned to the fuel enhancement system from other than back-pressure sensitive components, and that part of the returned fuel mixture is received by the circulation pump.

35. The system of claim 34 wherein the homogenization system further comprises respective valves, adapted to close upon shutdown of the engine, disposed between the pressurization pump and the engine, between the engine and the circulation pump, and between the circulation pump and the homogenization system first portion.

36. The system of claim 34 wherein: the valve disposed between the pressurization pump and the engine comprises a lockout valve.

37. The system of claim 36 wherein: the valves disposed between the engine and the circulation pump, and between the circulation pump and the homogenization system first portion comprise check valves.

38. The system of claim 35 wherein the valve disposed between the pressurization pump and the engine, comprises a pressure differential valve, comprising:
a body defining an interior cavity;
a fuel inlet, a fuel outlet; and an equalization port, each communicating with the interior cavity;
a plunger, slidably disposed within the interior cavity, isolating the valve fuel outlet from the equalization port and adapted to move between open and closed positions;
a receptacle, adapted to seat the plunger when in the closed position, effectively isolating the valve fuel input and fuel outlet;
the plunger, when in the open position, removed from the receptacle, such that a flow path is provided between the valve fuel input and fuel outlet;
and a spring disposed to exert a predetermined bias on the plunger toward the closed position;
the valve fuel input communicating with the pressurization pump, the valve fuel outlet communicating with the engine; and equalization port communicating with the circulation pump, downstream of the valve between the engine and the circulation pump.

39. The system of claim 1 wherein:
the engine includes an injection system and a combustion region,
the injection system controllably introducing the fuel mixture with bubbles of the gaseous component distributed throughout the mixture into the combustion region,
the pressure level within the combustion region being low relative to the second pressure at which the fuel mixture is introduced by the injection system such that the bubbles of the gaseous component expand when introduced into the combustion region.

40. The system of claim 39 wherein the expansion of the bubbles of the gaseous component promotes atomization of the liquid fuel within the combustion region.

41. The system of claim 39 wherein the expansion of the bubbles of the gaseous component promotes free radical combustion within the combustion region.

42. The system of claim 39 wherein the expansion of the bubbles of the gaseous component promotes adiabatic cooling within the combustion region.

43. The system of claim 20 wherein the fuel level detector comprises:
a guide shaft disposed within the interior volume;
a float element slidably mounted on guide shaft, adapted for movement in accordance with the level of fluid within the interior volume; and
a switch, cooperating with the float element, for generating the indicia of the fluid level in the internal volume.

44. The system of claim 43 wherein the fuel level detector further comprises:
anti-slosh tube, concentrically disposed with the guide shaft, extending beyond the guide shaft a predetermined distance into the internal volume and having an open end providing communication between the interior of anti-slosh tube and the internal volume;
the switch and float element being disposed within the interior of the anti-slosh tube.

45. The system of claim 44 wherein the anti-slosh tube includes a passageway communicating between the interior of the anti-slosh tube and the internal volume.

46. The system of claim 1 wherein the homogenization system includes a second portion including: a circulation pump receptive of the output of the homogenization system first portion, and fuel mixture supplied to, but unused by, the engine, returned to the fuel enhancement system from other than back-pressure sensitive components, for raising the fuel mixture passing therethrough to an intermediate pressure higher than the second pressure level; and an infusion volume receptive of the output of the circulation pump.

47. The system of claim 1 wherein:
the controller comprises first and second timers,
the first timer being actuated in response to the indicia of at least one predetermined operating parameter and generating a control signal of a first predetermined duration to the liquid fuel flow control device, to cause the addition of a predetermined amount of liquid fuel to the gas processor,
the second timer being actuated in response to the indicia of at least one predetermined operating parameter and generating a control signal of a second predetermined duration to the gaseous component flow control device, to cause the addition of a predetermined amount of gaseous component to the homogenization system.

48. A fuel enhancement system, adapted to cooperate with an engine, a source of liquid fuel, and a source of gaseous component, for supplying the engine with a pressurized homogenized fuel mixture comprising a mixture of the liquid fuel and the gaseous component, the fuel enhancement system comprising:
a controller; a gaseous component flow control device, a device for generating signals indicative of liquid fuel flow, and a homogenization system;
the gaseous component flow control device being adapted to cooperate with the source of the gaseous component and, responsive to control signals applied thereto, controllably provide gaseous component to the homogenization system;
the controller being receptive of the signals indicative of liquid fuel flow, and adapted to provide control signals to the gaseous component flow control device to control the ratio of gaseous component to liquid fuel;
the homogenization system being adapted to mix the liquid fuel and gaseous component, and provide a fuel mixture to the engine at a second pressure having bubbles of the gaseous component distributed throughout the mixture;

the device for generating signals indicative of liquid fuel flow comprising:
  a body defining an interior volume;
  a fuel inlet, communicating with the interior volume, adapted to receive the liquid fuel from the liquid fuel source;
  a fuel outlet, communicating with the interior volume, adapted to supply the fuel exiting the interior volume to the homogenization system at a first pressure; and
  a fuel level detector disposed within the interior volume, the fuel level detector generating indicia of the fluid level in the internal volume, the indicia of the fluid level in the internal volume being provided as signals indicative of liquid fuel flow to the controller.

49. The system of claim 48 wherein the fuel level detector comprises:
  a guide shaft disposed within the interior volume;
  a float element slidably mounted on guide shaft, adapted for movement in accordance with the level of fluid within the interior volume; and
  a switch, cooperating with the float element, for generating the indicia of the fluid level in the internal volume.

50. The system of claim 49 wherein the fuel level detector further comprises:
  anti-slosh tube, concentrically disposed with the guide shaft, extending beyond the guide shaft a predetermined distance into the internal volume and having an open end providing communication between the interior of anti-slosh tube and the internal volume;
  the switch and float element being disposed within the interior of the anti-slosh tube.

51. The system of claim 50 wherein the anti-slosh tube includes a passageway communicating between the interior of the anti-slosh tube and the internal volume.

52. The system of claim 48 wherein the engine is adapted to accept a portion of pressurized homogenized fuel mixture supplied thereto in accordance with demand and return the unused portion to the homogenization system.

53. The system of claim 52 wherein the homogenization system comprises:
  a first portion adapted to receive the gaseous component, to receive liquid fuel, and produce a liquid-gaseous fuel mixture;
  a second portion receptive of the liquid-gaseous fuel mixture and the returned unused fuel mixture from the engine, the second portion including at least one pump and an infusion volume through which the liquid-gaseous mixture must traverse, the infusion volume configured such that liquid-gaseous fuel mixture exiting the infusion volume has bubbles of the gaseous component distributed uniformly throughout the mixture; and
  a pressurization pump disposed between the second portion and the engine, for increasing the pressure of the fuel mixture applied to the engine to the second pressure.

54. The system of claim 53 wherein the homogenization system first portion includes: first and second pumps; the first pump being receptive of the liquid fuel, for increasing the pressure of the liquid fuel to a first low pressure level; the second pump being receptive of the output of the first pump and gaseous component provided by the flow control device, increasing the pressure of the fuel mixture passing therethrough to a second pressure level, the second pressure level being higher than the first low pressure level.

55. The system of claim 53 wherein the homogenization system second portion further includes a bypass line communicating between the output of the infusion volume and the input of the second portion pump.

56. The system of claim 53 wherein the controller generates control signals to the gaseous component flow control device to introduce a predetermined amount of gaseous component into the homogenization system in response to the introduction of a predetermined amount of liquid fuel into the homogenization system.

57. The system of claim 46 wherein the gaseous component is hydrogen and the liquid fuel is diesel.

58. The system of claim 46 wherein the gaseous component within the fuel mixture applied to the engine is in the form of bubbles.

59. The system of claim 58 wherein the bubbles of the gaseous component are micro-bubbles.

60. The system of claim 56 wherein:
  the engine includes an injection system and a combustion region,
  the injection system controllably introducing the fuel mixture with bubbles of the gaseous component into the combustion region,
  the pressure level within the combustion region being low relative to the relatively-high second pressure at which the fuel mixture is introduced by the injection system such that the bubbles of the gaseous component expand when introduced into the combustion region.

61. The system of claim 60 wherein the expansion of the bubbles of the gaseous component causes the liquid fuel to atomize within the combustion region.

62. The system of claim 60 wherein the expansion of the bubbles of the gaseous component causes free radical combustion within the combustion region.

63. The system of claim 60 wherein the expansion of the bubbles of the gaseous component causes an adiabatic cooling effect within the combustion region.

64. The system of claim 48 wherein:
  the engine includes at least one back-pressure sensitive component, where, in operation, at least part of the fuel mixture supplied to, but unused by, the engine is returned to the fuel enhancement system from at least one back-pressure sensitive component; and
  the device for generating signals indicative of liquid fuel flow is adapted to receive the fuel mixture supplied to, but unused by, the at least one back-pressure sensitive component.

65. The system of claim 64 wherein the device for generating signals indicative of liquid fuel flow further comprises a gas outlet.

66. The system of claim 65 wherein the engine includes an air intake and the gas outlet is adapted to be connected to the engine air intake.

67. The system of claim 46 wherein the fuel level detector comprises:
  a switch cooperating with a float element adapted for movement in accordance with the level of fluid within the interior volume;
  the switch being disposed within the interior volume at a position corresponding to a predetermined fuel level, and operating to generate the indicia of fuel level in accordance with proximity of the float element.

68. The system of claim 67 wherein the float element includes a magnet and the switch is magnetically actuated.

69. The system of claim 47 wherein the float element includes a magnet and the switch is magnetically actuated.

70. The system of claim 48 wherein the float element includes a magnet and the switch is magnetically actuated.

71. The system of claim 46 wherein, in response to the indicia of the fuel level, the controller generates control signals to the gaseous component flow control device to introduce a predetermined amount of gaseous component into the homogenization system corresponding to a predetermined amount of liquid fuel into the homogenization system.

72. The system of claim 46 wherein the liquid fuel source includes a pump, responsive to control signals applied thereto, and, in response to the indicia of the fuel level, the controller generates control signals to the liquid fuel source pump to introduce a predetermined amount of liquid fuel into the homogenization system, and control signals to the gaseous component flow control device to introduce a predetermined amount of gaseous component into the homogenization system.

73. The system of claim 48 wherein, in response to the indicia of the fuel level, the controller generates control signals to the gaseous component flow control device to introduce a predetermined amount of gaseous component into the homogenization system corresponding to a predetermined amount of liquid fuel into the homogenization system.

74. The system of claim 48 wherein the liquid fuel source includes a pump, responsive to control signals applied thereto, and, in response to the indicia of the fuel level, the controller generates control signals to the liquid fuel source pump to introduce a predetermined amount of liquid fuel into the homogenization system, and control signals to the gaseous component flow control device to introduce a predetermined amount of gaseous component into the homogenization system.

75. A device adapted for use within a fuel enhancement system for supplying an engine with a pressurized homogenized fuel mixture comprising a mixture of a liquid fuel and a gaseous component, the fuel enhancement system cooperating with a source of liquid fuel and a source of gaseous component, and controlling the ratio of the gaseous component to liquid fuel in the mixture, the device comprising:
a body defining an interior volume;
a fuel inlet, communicating with the interior volume, adapted to receive the liquid fuel from the liquid fuel source;
a fuel outlet, communicating with the interior volume, adapted to supply the fuel exiting the interior volume to the enhancement system; and
a fuel level detector disposed within the interior volume, the fuel level detector generating indicia of the fluid level in the internal volume, the indicia of the fluid level in the internal volume being utilized by the fuel enhancement system to control the amount of gaseous component admitted to the fuel enhancement system from the source of gaseous component;
wherein the fuel enhancement system supplies an engine including at least one back-pressure sensitive component, the device is adapted to receive, the fuel mixture supplied to, but unused by, the least one back-pressure sensitive component.

76. A device adapted for use within a fuel enhancement system for supplying an engine with a pressurized homogenized fuel mixture comprising a mixture of a liquid fuel and a gaseous component, the fuel enhancement system cooperating with a source of liquid fuel and a source of gaseous component, and controlling the ratio of the gaseous component to liquid fuel in the mixture, the device comprising:
a body defining an interior volume;
a fuel inlet, communicating with the interior volume, adapted to receive the liquid fuel from the liquid fuel source;
a fuel outlet, communicating with the interior volume, adapted to supply the fuel exiting the interior volume to the enhancement system; and
a fuel level detector disposed within the interior volume, the fuel level detector generating indicia of the fluid level in the internal volume, the indicia of the fluid level in the internal volume being utilized by the fuel enhancement system to control the amount of gaseous component admitted to the fuel enhancement system from the source of gaseous component;
wherein the fuel level detector comprises:
a guide shaft disposed within the interior volume;
a float element slidably mounted on guide shaft, adapted for movement in accordance with the level of fluid within the interior volume; and
a switch, cooperating with the float element, for generating the indicia of the fluid level in the internal volume.

77. The device of claim 76 wherein the fuel level detector further comprises:
anti-slosh tube, concentrically disposed with the guide shaft, extending beyond the guide shaft a predetermined distance into the internal volume and having an open end providing communication between the interior of anti-slosh tube and the internal volume;
the switch and float element being disposed within the interior of the anti-slosh tube.

78. The device of claim 77 wherein the anti-slosh tube includes a passageway communicating between the interior of the anti-slosh tube and the internal volume.

79. The device of claim 75 wherein the engine includes an air intake and the device includes a gas outlet communicating with the interior volume, adapted to be connected to the engine air intake.

80. The device of claim 76 wherein:
the body comprises a hollow cylindrical tube of predetermined diameter and length, cooperating with first and second end caps;
the fuel inlet comprises a passageway through one of the first and second end caps;
the fuel outlet comprises a passageway through one of the first and second end caps; and
the guide shaft is mounted on the first end cap extending a predetermined distance into the interior volume;
and the switch is disposed at a predetermined position on the guide element corresponding to a predetermined fluid level in the internal volume.

81. The device of claim 80 wherein the fuel level detector further comprises:
anti-slosh tube, concentrically disposed with the guide shaft, extending from the first end cap into the internal volume a predetermined distance beyond the guide shaft and having an open end providing communication between the interior of anti-slosh tube and the internal volume;
the switch and float element being disposed within the interior of the anti-slosh tube.

82. The device of claim 80 wherein the fuel inlet and fuel outlet comprise passageways through the first end cap.

83. The device of claim 81 wherein the anti-slosh tube includes a passageway communicating between the interior of the anti-slosh tube and the internal volume, the passageway being disposed a predetermined axial distance from the switch.

84. The device of claim 83 wherein the engine includes an air intake and the device includes a gas outlet comprising a passageway through the second end cap communicating with the interior volume, adapted to be connected to the engine air intake.

85. The device of claim 81 wherein:
the first end cap is a bottom end cap, and second end cap is a top end cap;
the fuel inlet and fuel outlet are disposed in bottom end cap; and
anti-slosh tube extends upwardly from the bottom end cap and includes a distal opening disposed a predetermined distance above the anticipated surface level of the fuel mixture in the internal volume and a passageway extending from the interior of anti-slosh tube to the internal volume disposed below the anticipated surface level of the mixture in the internal volume.

86. The device of claim 85 wherein the device further includes a gas outlet comprising a passageway through the second end cap communicating with the interior volume.

87. The device of claim 86 wherein the engine includes an air intake and the gas outlet is adapted to be connected to the engine air intake.

88. The device of claim 76 wherein the fuel enhancement system supplies an engine including at least one back-pressure sensitive component, the device is adapted to receive, the fuel mixture supplied to, but unused by, the least one back-pressure sensitive component.

89. The system of claim 76 wherein the float element includes a magnet and the switch is magnetically actuated.

90. The device of claim 75 wherein the fuel level detector comprises:
a guide shaft disposed within the interior volume;
a float element slidably mounted on guide shaft, adapted for movement in accordance with the level of fluid within the interior volume; and
a switch, cooperating with the float element, for generating the indicia of the fluid level in the internal volume;
anti-slosh tube, concentrically disposed with the guide shaft, extending into the internal volume a predetermined distance beyond the guide shaft and having an open end providing communication between the interior of anti-slosh tube and the internal volume;
the switch and float element being disposed within the interior of the anti-slosh tube.

91. A method of outgassing a gaseous component of a fuel-liquid fuel mixture provided to an engine having an air intake, the method comprising:
mixing the gaseous component with a liquid fuel to form the fuel-liquid fuel mixture;
pressurizing the fuel-liquid fuel mixture at a first pressure;
injecting a first portion of the fuel-liquid fuel mixture into an engine cylinder;
conducting a second portion of the fuel-liquid fuel mixture to a gas processor;
holding the second portion of the fuel-liquid fuel mixture in the gas processor at lower pressure than the first pressure to outgas the gaseous component; and
conducting the outgassed gaseous component to the air intake.

92. The method according to 91, wherein the first pressure is selected from a range of between 60 to 2000 PSI.

93. The method according to 91, further comprising providing the engine with a recirculation loop and homogenization system;
directing the liquid fuel portion of the outgassed second portion of the fuel-liquid fuel mixture to the recirculation loop; and
providing the liquid fuel portion to the homogenization system.

94. The method according to 91, further comprising providing the gas processor with a controller that controls the providing of the liquid fuel portion to the homogenization system.

95. The system of claim 48, wherein the first pressure is lower than the second pressure.

96. The system of claim 48, wherein the first pressure is lower than the second pressure.

* * * * *